United States Patent
Arai et al.

(10) Patent No.: US 7,583,706 B2
(45) Date of Patent: Sep. 1, 2009

(54) METHOD AND APPARATUS FOR INCREASING PACKET THROUGHPUT IN CROSSBAR

(75) Inventors: Hideto Arai, Kawasaki (JP); Nobuyuki Suzuki, Kawasaki (JP); Hidekazu Osano, Kawasaki (JP); Shu Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 636 days.

(21) Appl. No.: 11/181,826

(22) Filed: Jul. 15, 2005

(65) Prior Publication Data

US 2006/0209820 A1 Sep. 21, 2006

(30) Foreign Application Priority Data

Mar. 18, 2005 (JP) .............................. 2005-078846

(51) Int. Cl.
*H04J 3/06* (2006.01)
(52) U.S. Cl. .................... 370/513; 370/503; 370/360
(58) Field of Classification Search .................. None
See application file for complete search history.

(56) References Cited

U.S. PATENT DOCUMENTS

| 5,345,559 A | 9/1994 | Okazaki et al. |
| 5,559,970 A | 9/1996 | Sharma |
| 5,768,546 A | 6/1998 | Kwon |

FOREIGN PATENT DOCUMENTS

JP 9-81508 3/1997

OTHER PUBLICATIONS

Extended European Search Report, mailed May 8, 2008 and issued in corresponding European Patent Application No. 05254417.8-1243.
A. Takase et al., "Datapath Architecture and Technology for Large Scale ATM Switching Systems", Global Telecommunications Conference, IEEE, Nov. 18, 2006; pp. 1395-1399.

*Primary Examiner*—Daniel J Ryman
*Assistant Examiner*—Tito Pham
(74) *Attorney, Agent, or Firm*—Staas & Halsey LLP

(57) ABSTRACT

The frequency of the internal clock is set at ½ of the frequency of an external clock as well as the width of the internal bus is configured to be twice as wide as the width of an external bus. A write control unit controls a bypass unit and a swap circuit unit and, when a plurality of packets are received, writes words of the packets such that headers H of the received packets are respectively arranged alternately in each packet storage sector between an even-numbered queue and an odd-numbered queue. A read control unit reads the words of the packets in parallel by two words at each time from the even-numbered queue and the odd-numbered queue.

22 Claims, 23 Drawing Sheets

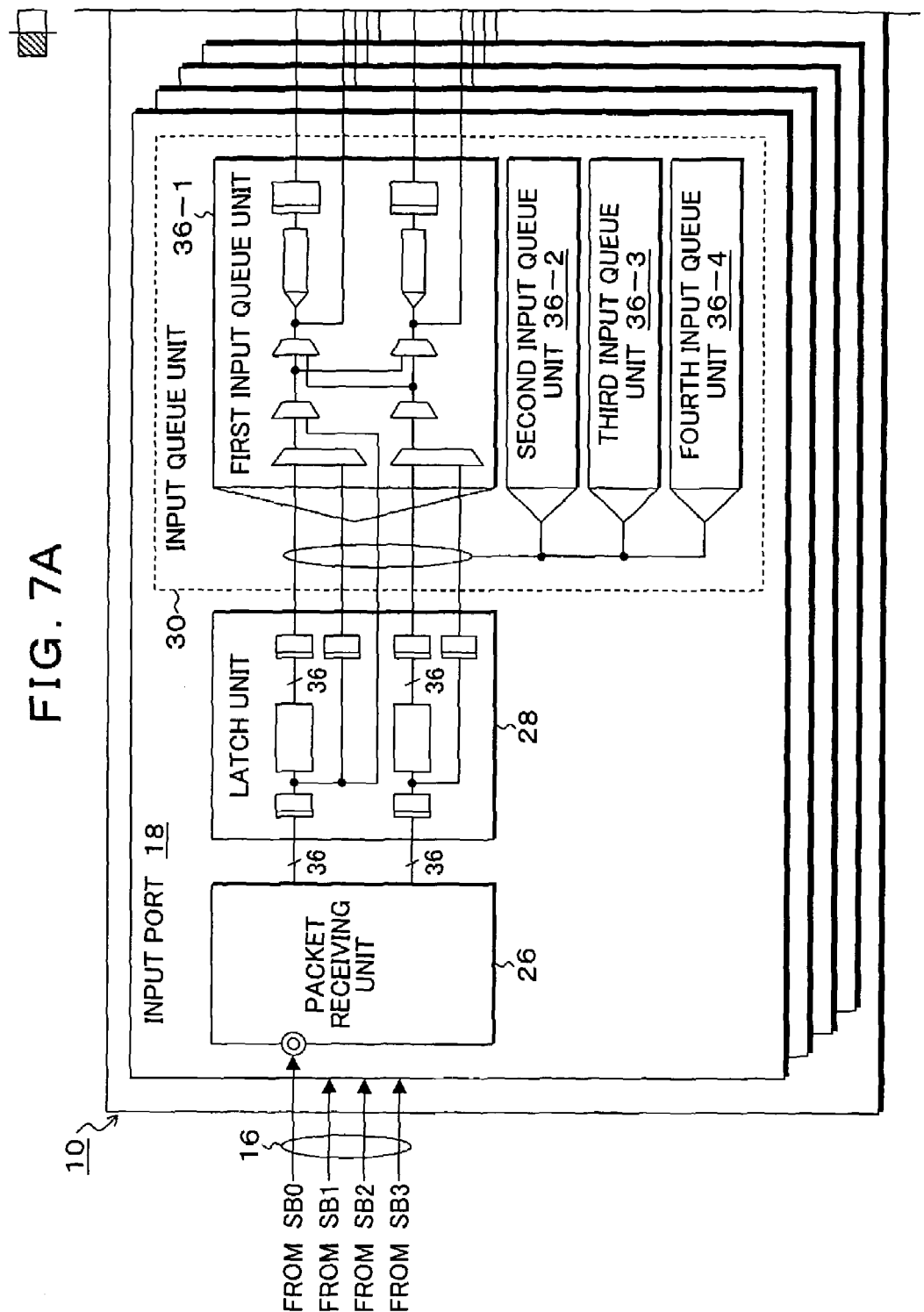

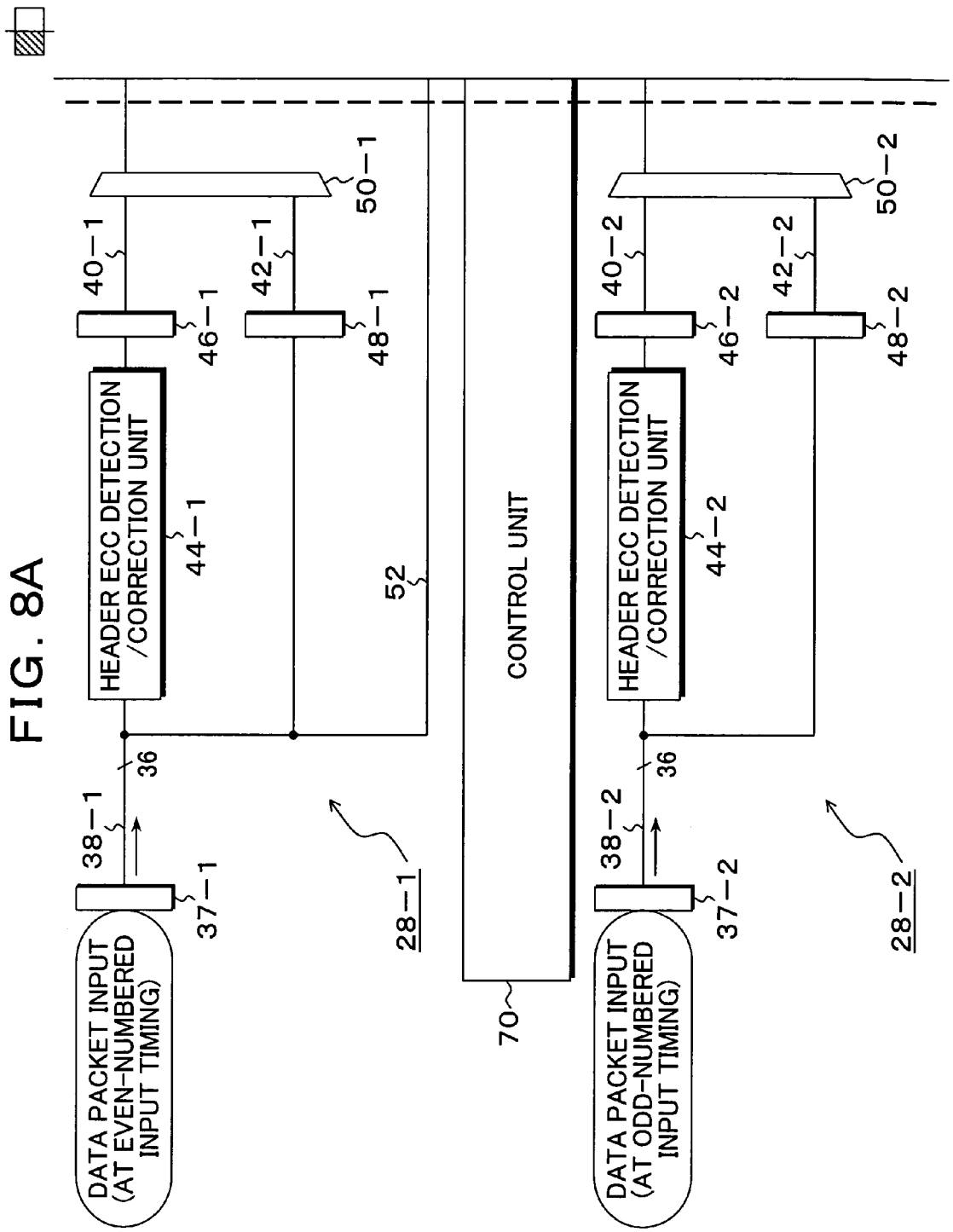

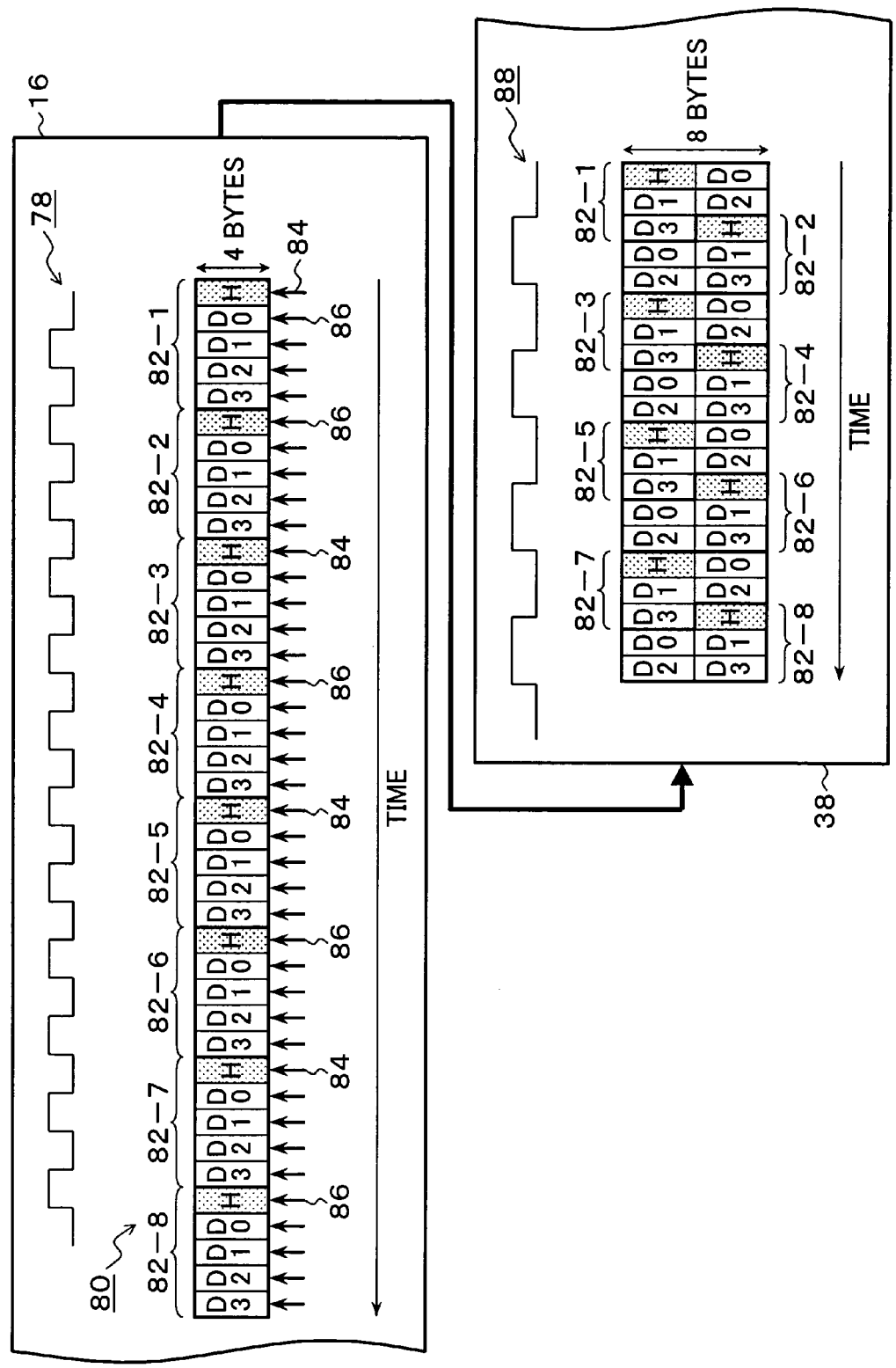

FIG. 10
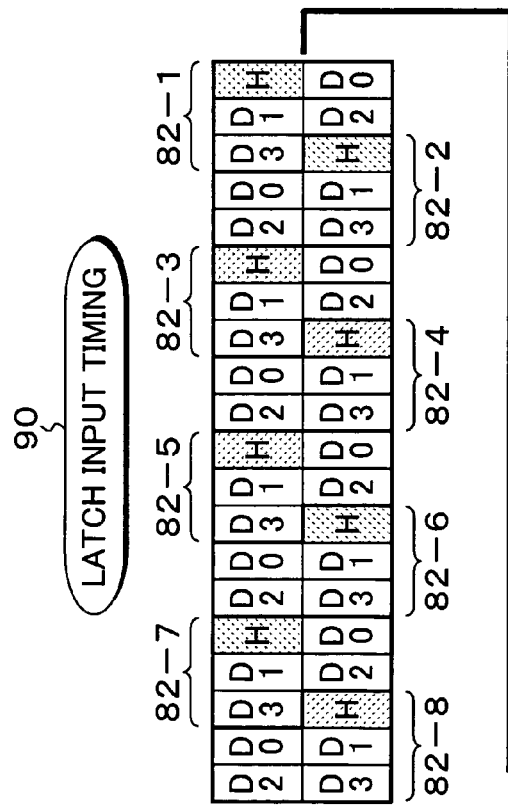
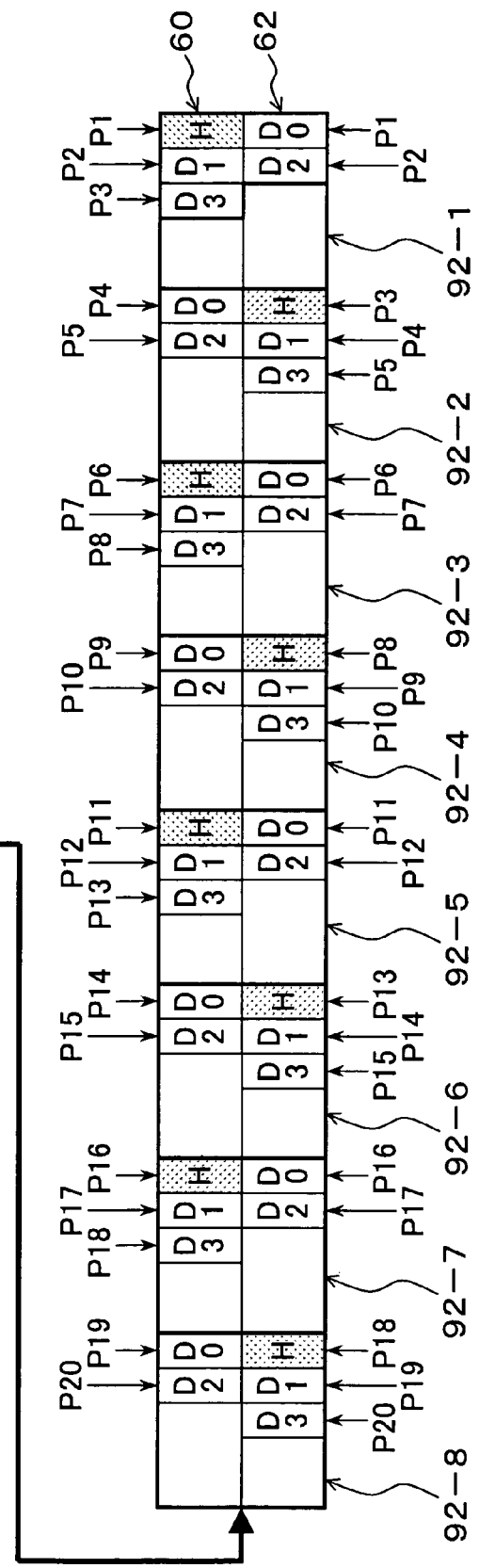

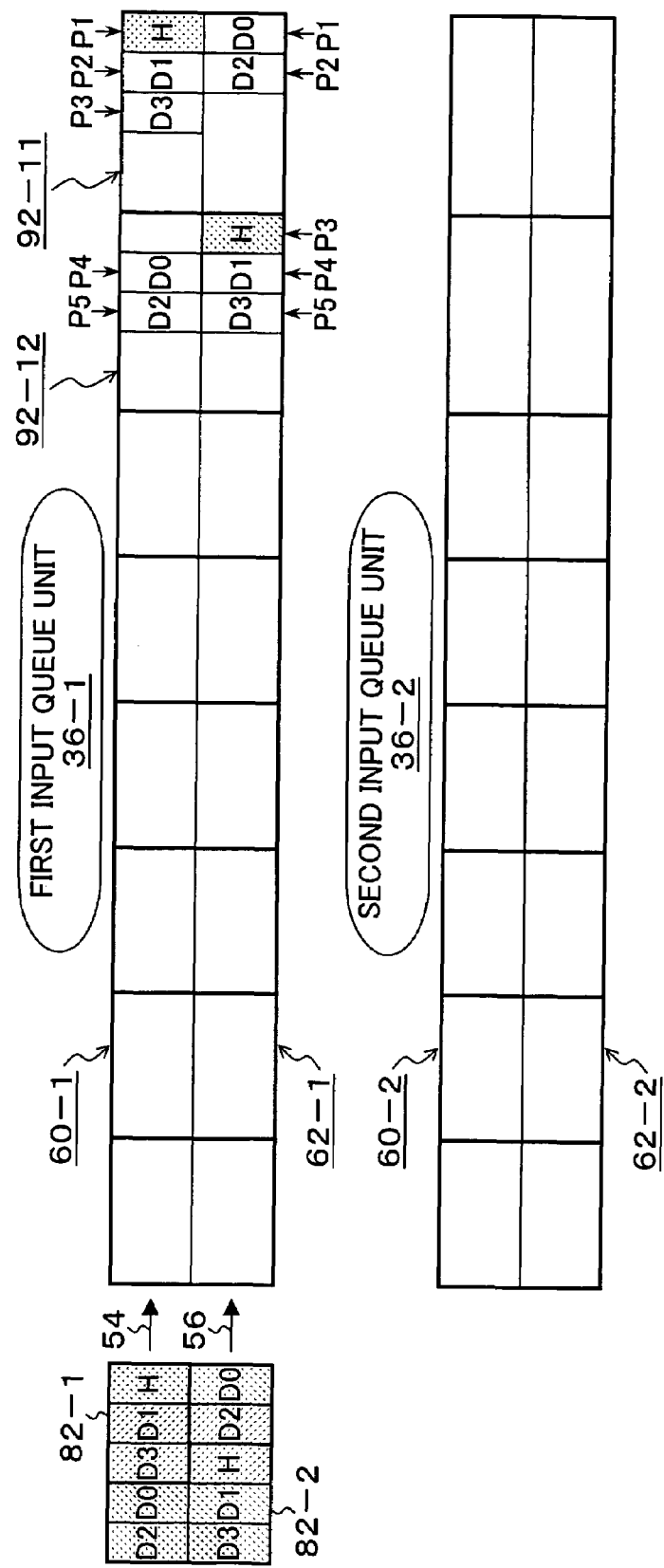
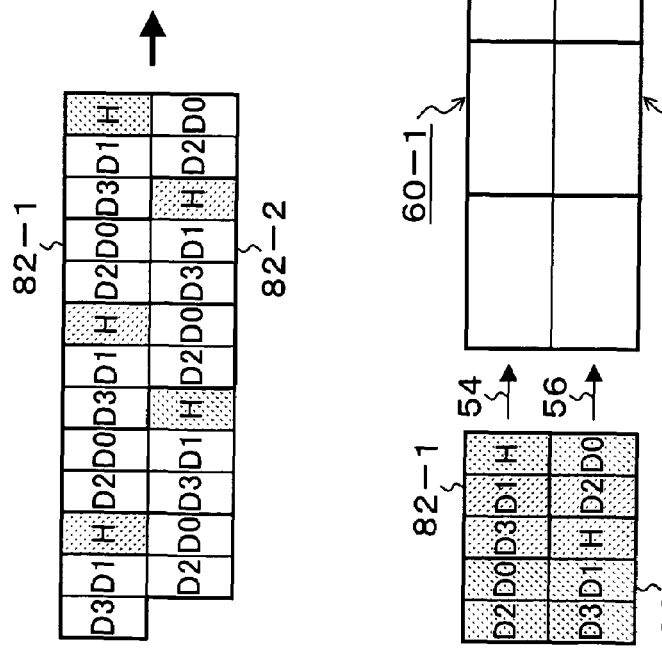

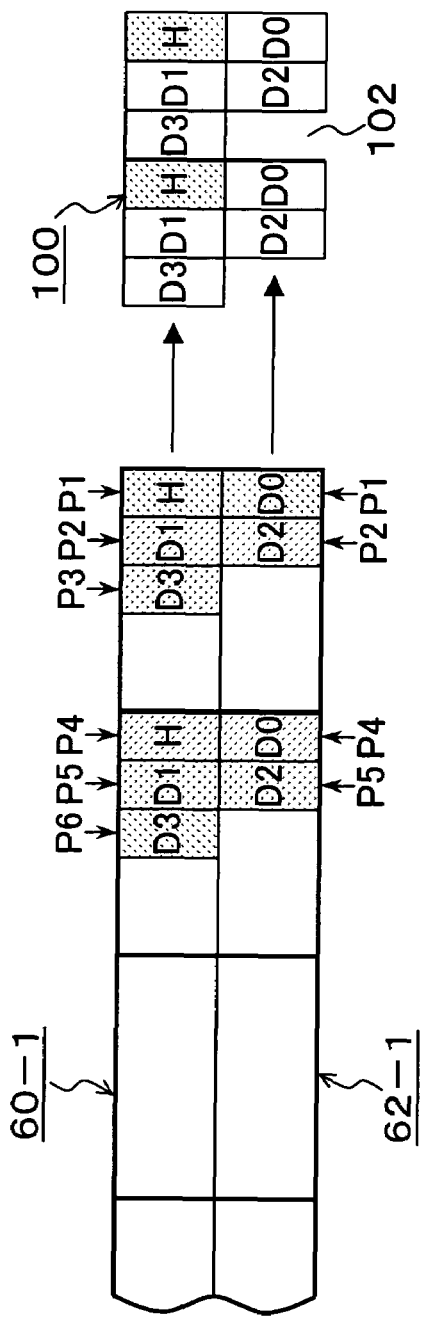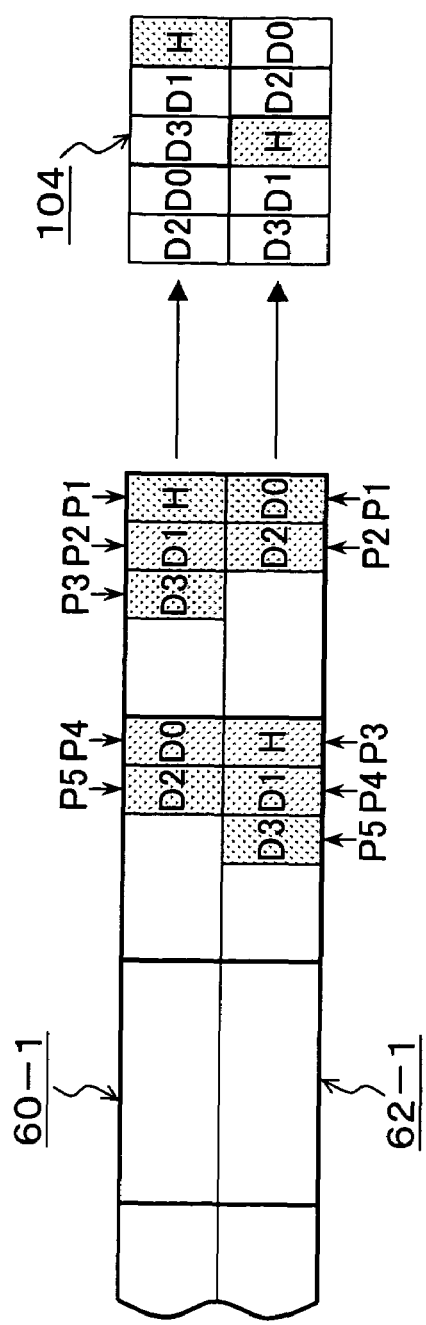
PRIOR ART
FIG. 14A
CONVENTIONAL
FIG. 14B
THE INVENTION

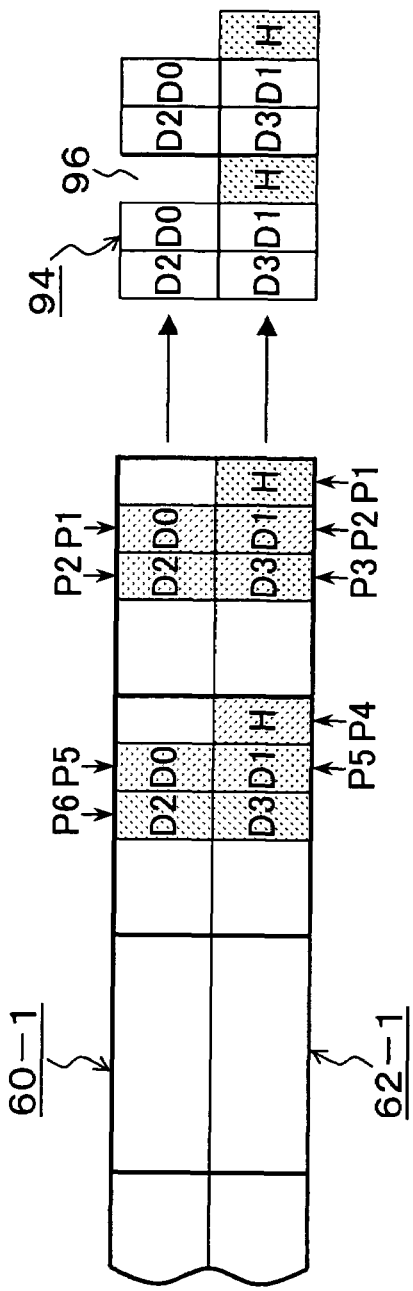
PRIOR ART
FIG. 15A
CONVENTIONAL
THE INVENTION

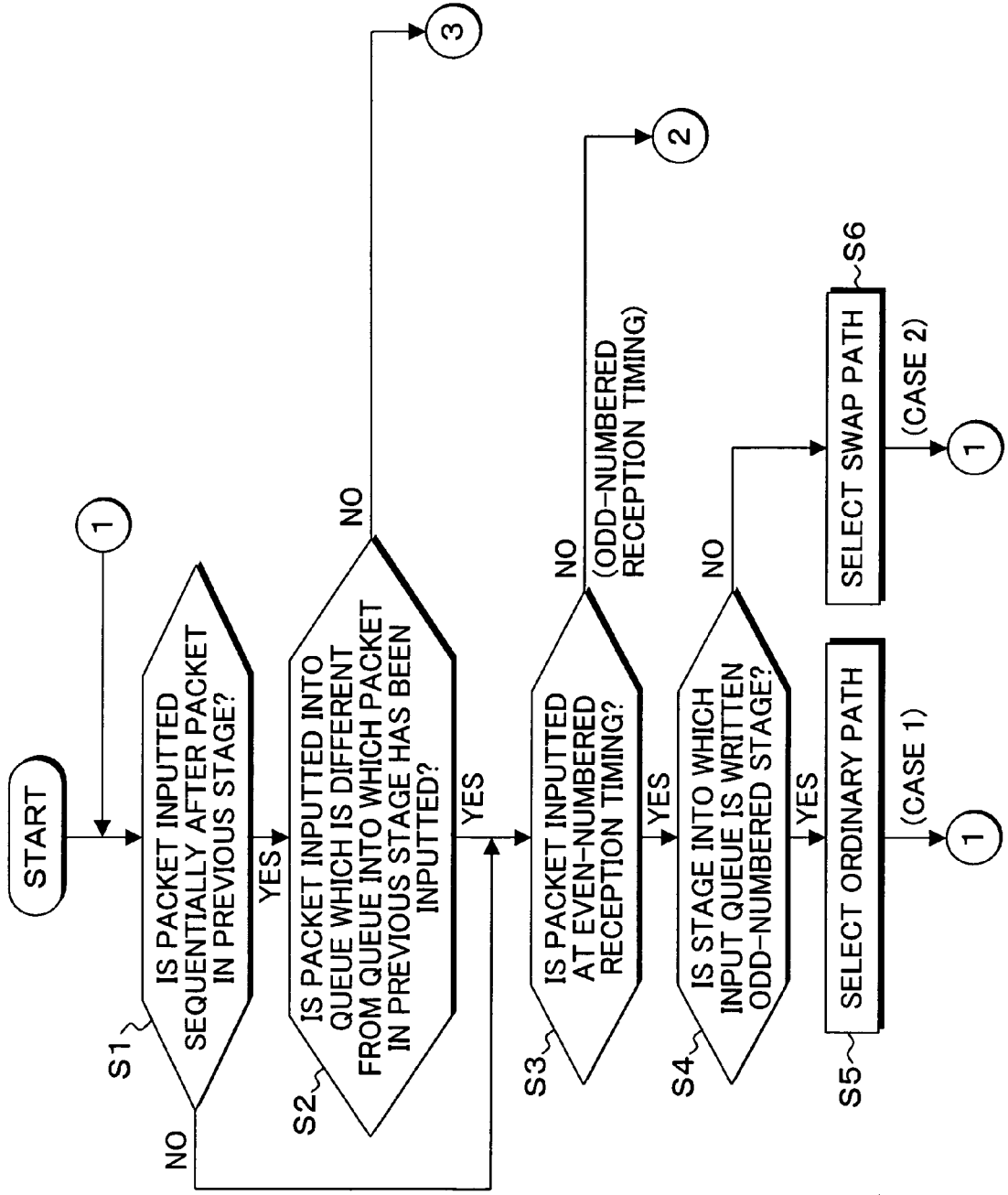

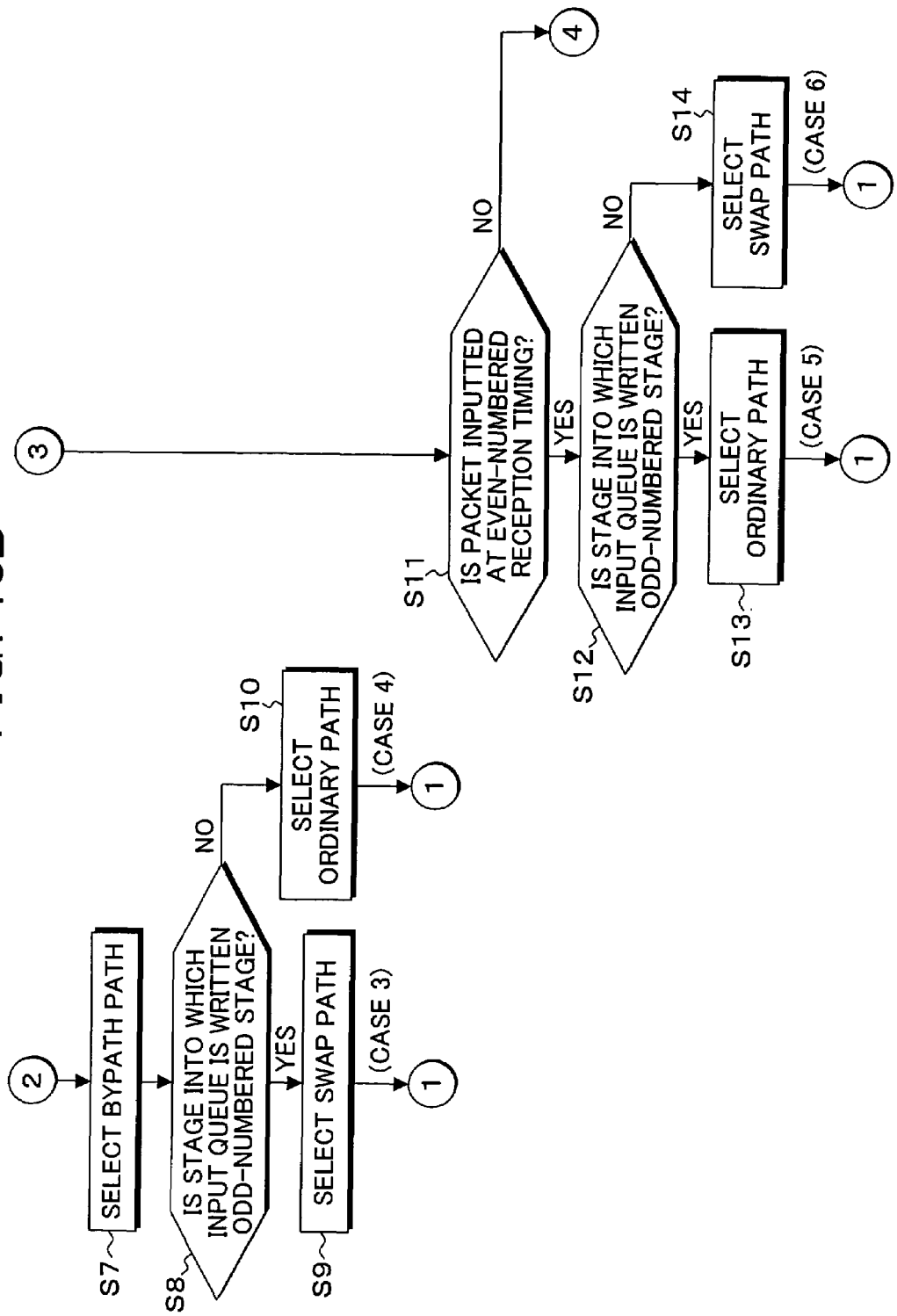

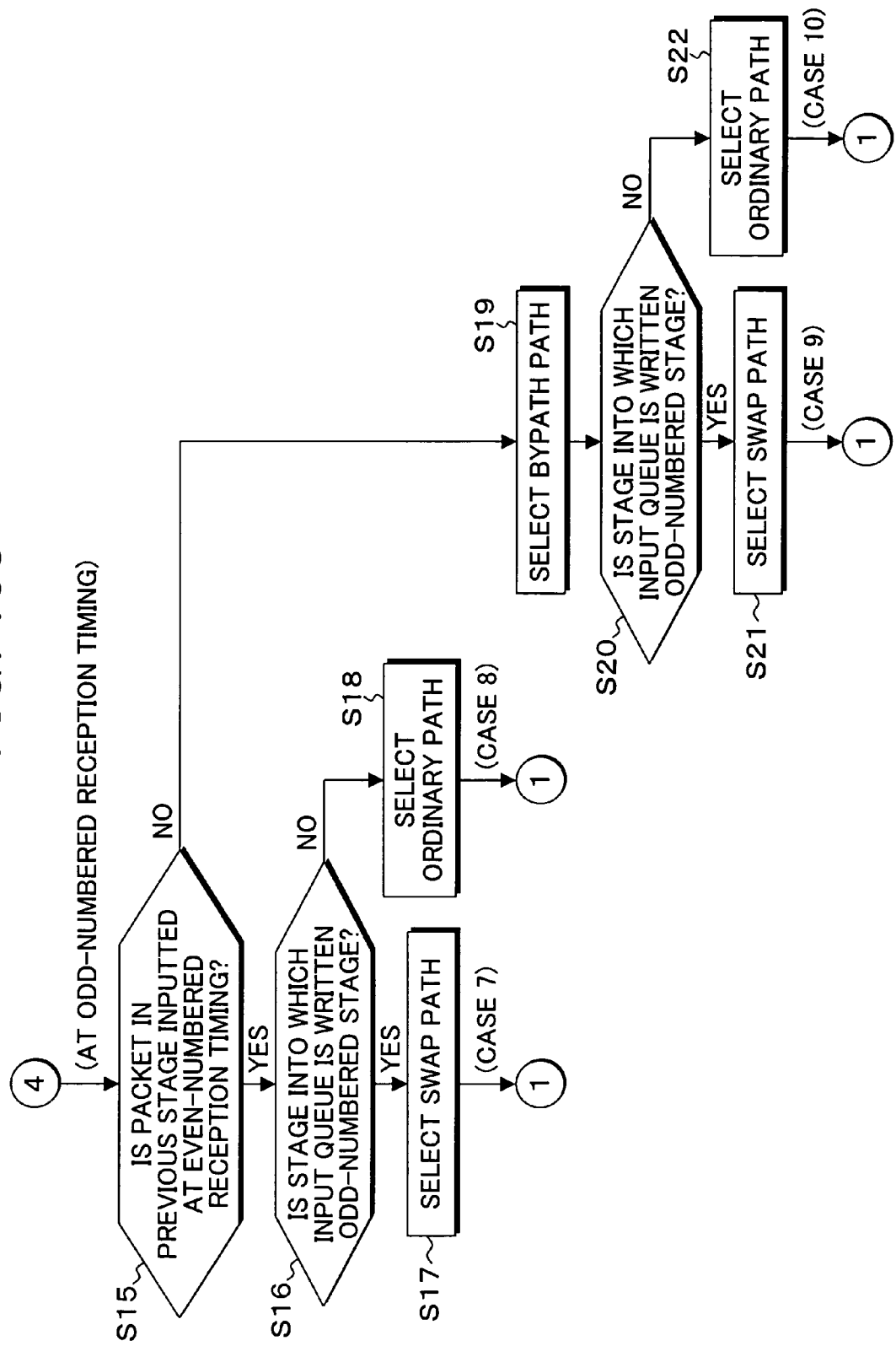

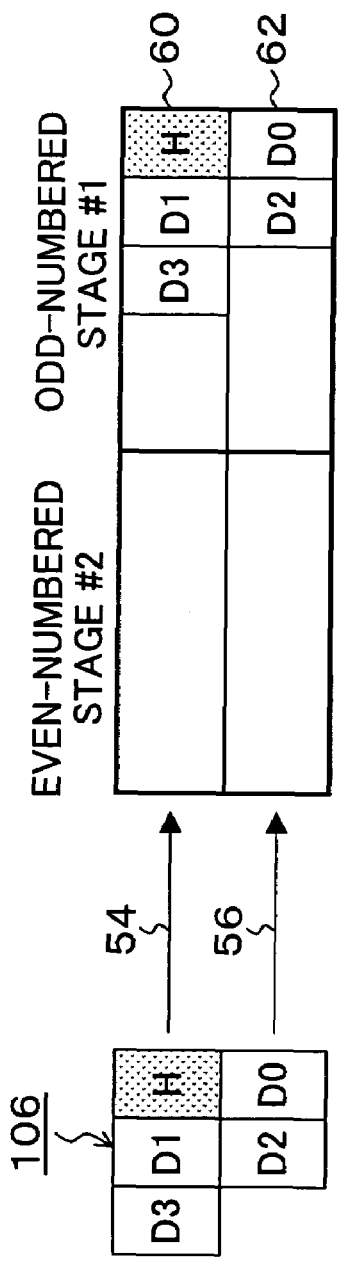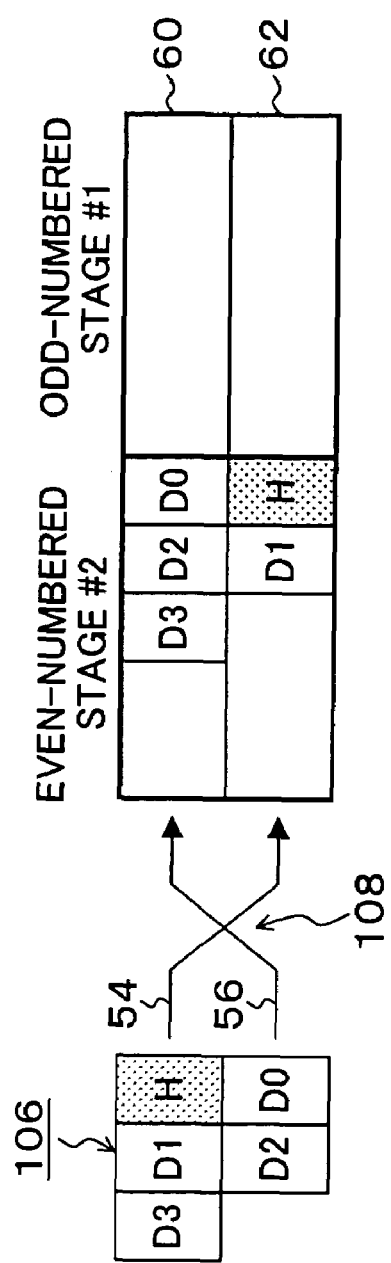
FIG. 17A
CASE 1 (CASE 5)
FIG. 17B
CASE 2 (CASE 6)

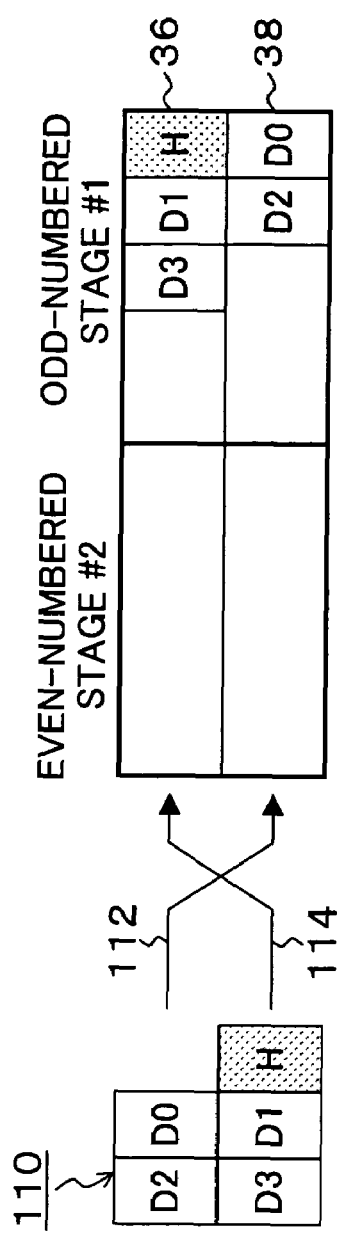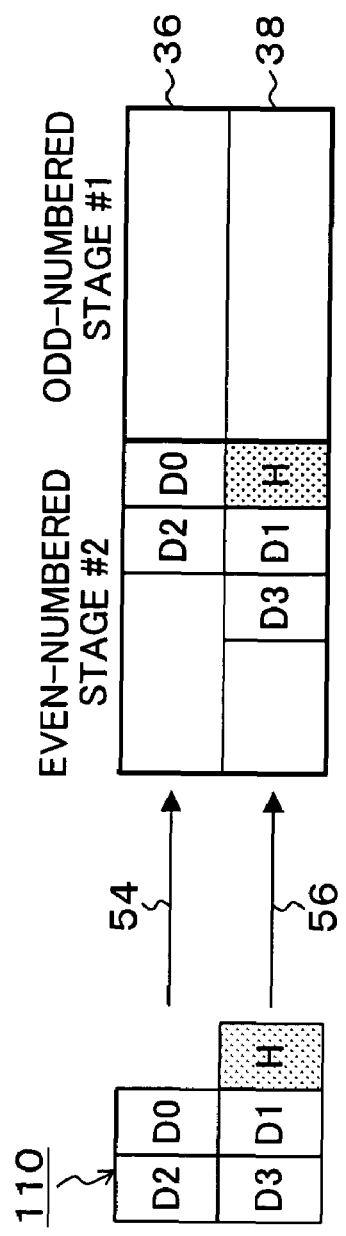
FIG. 17C
CASE 3
FIG. 17D
CASE 4

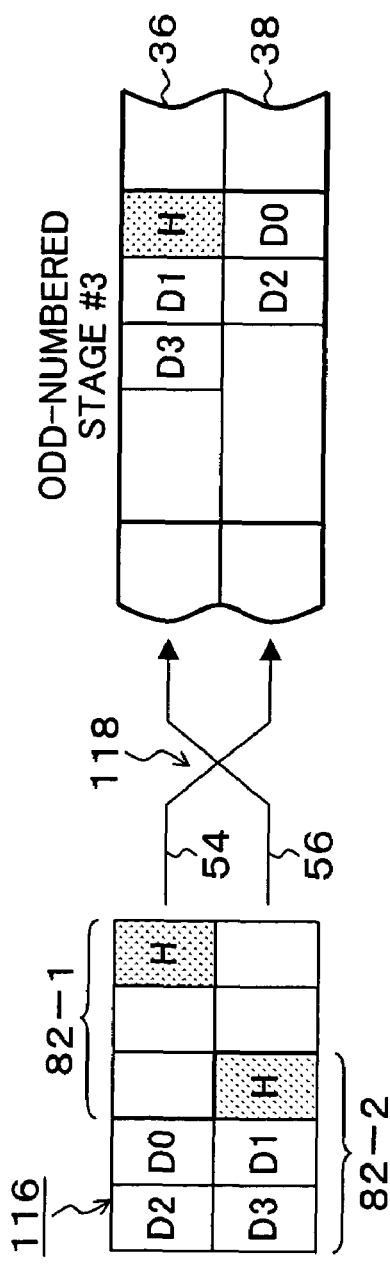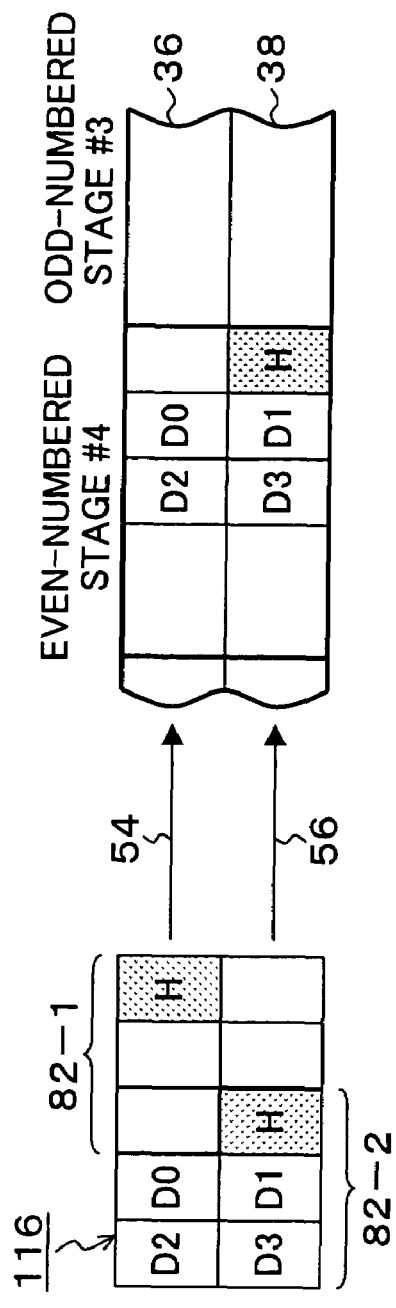
FIG. 17E
CASE 7
FIG. 17F
CASE 8

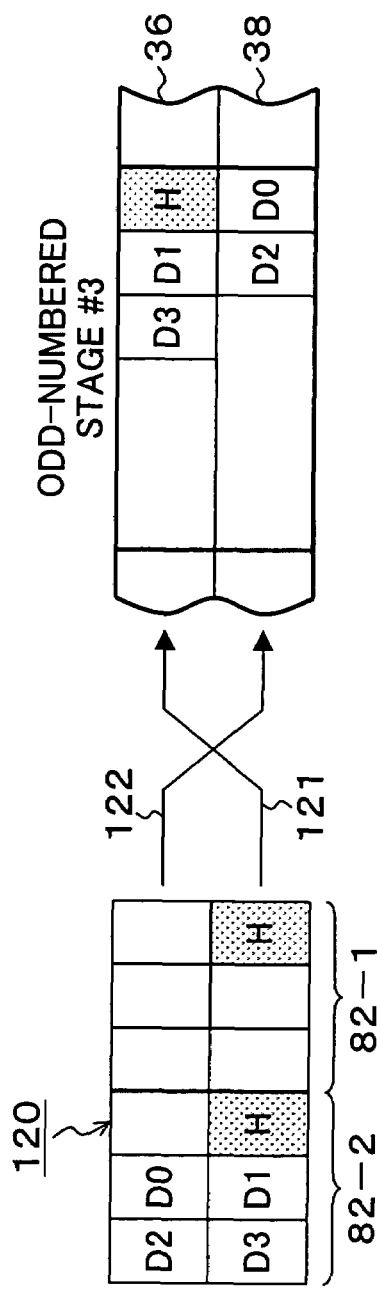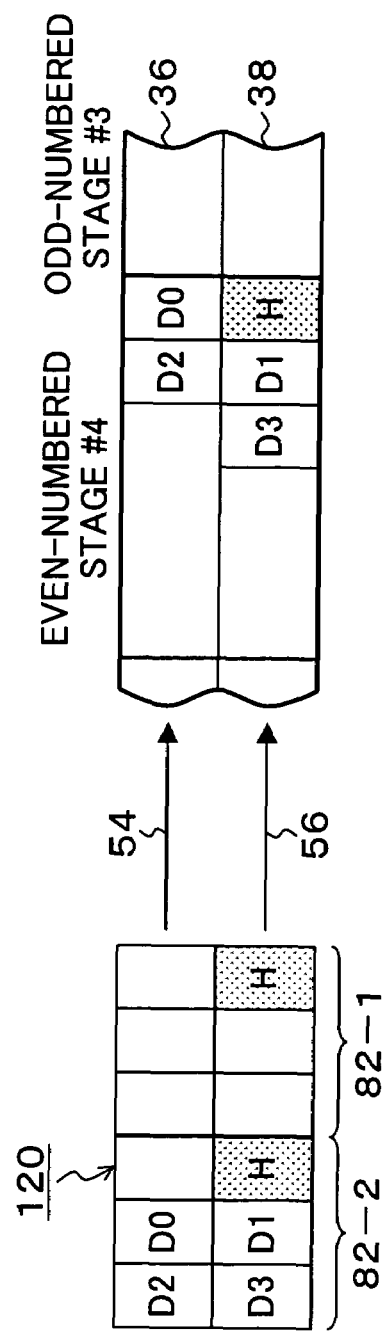
FIG. 17G
CASE 9
FIG. 17H
CASE 10

METHOD AND APPARATUS FOR INCREASING PACKET THROUGHPUT IN CROSSBAR

BACKGROUND OF THE INVENTION

1. Field of the Invention

The present invention relates generally to a cross bar apparatus for transferring data using packets mutually between a plurality of LSI modules such as MPUs and subsystems, and a control method and a program thereof, and more particularly, to a cross-bar apparatus that has improved the throughput of data packets to be written into input queues inside a cross bar, and a control method and a program thereof.

2. Description of the Related Art

Conventionally, a cross bar apparatus has a function for relaying data packets between different LSI modules. In such a cross bar apparatus, input queues for storing packets transferred from the LSI modules are provided. The cross bar apparatus is adapted to write the received packets into the input queues classifying the packets by destination and, thereafter, to select the packets read from the input queues by sorting the packets into output queues each of which is provided for each destination, and to transmit the packets to destination LSI modules from the output queues. FIG. 1 is a block diagram of an input queue unit provided to a conventional cross bar apparatus. In FIG. 1, data packets transferred according to an external clock from an originator LSI module through an external bus are received by a packet receiving unit not shown. In this case, the frequency of the internal clock of the cross bar apparatus is set at ½ of that of the external clock used for transferring the packets mutually between the LSI modules, and the width of internal buses is configured to be two (2) times as big as that of external buses. For example, when the width of the external buses is 36 bits, that of the internal buses is 72 bits by using parallel internal buses. Then, a transferred packet consists of a header and a plurality of words and has a length equal to the length of odd-number words. Having received packets from the external buses, the packet receiving unit outputs headers of the received packets and words following the headers in parallel to the internal buses, classifying these headers and words into those at even-numbered reception timing and those at odd-numbered reception timing defined by the external clock. Then, the headers and the words at even-numbered reception timing are inputted into an even-numbered latch unit 200 and the headers and the words at odd-numbered reception timing are inputted into an odd-numbered latch unit 202. The even-numbered latch unit 200 branches an input path thereof into a header portion passing path 204 and a data portion passing path 206. A header ECC detection/correction unit 208 and a header latch 210 are provided to the header portion passing path 204, and a data latch 212 is provided to the data portion passing path 206. The packets are inputted from a selector 216 through a path 215 into an input queue unit 230. Similarly, the odd-numbered latch unit 202 branches an input path thereof into a header portion passing path 217 and a data portion passing path 218. A header ECC detection/correction unit 220 and a header latch 222 are provided to the header portion passing path 217, and a data latch 224 is provided to the data portion passing path 218. The packets are inputted from a selector 226 through a path 225 into the input queue unit 230. The header detection/correction units 208 and 220 detect and correct errors in the headers of the packets and, after retaining the headers in the header latches 210 and 222, write the headers into the input queue unit 230. Concurrently, having detected the validity of the headers, the header ECC detection/correction units 208 and 220, based on data length information contained in the headers, select the words of the packets corresponding to the data length through the data portion passing paths 206 and 218 and send these words of the packets to the input queue unit 230. The input queue unit 230 is provided with an even-numbered input queue unit 232 and an odd-numbered queue unit 234. Transfer addresses are divided into four transfer address groups in order to improve the throughput by reducing the rate of same addresses, and the even-numbered input queue unit 232 is provided with a first even-numbered queue 236-1, a second even-numbered queue 236-2, a third even-numbered queue 236-3 and a fourth even-numbered queue 236-4 that use respectively a FIFO buffer, for each of the transfer address groups respectively. Similarly, the odd-numbered input queue unit 234 is also provided with a first odd-numbered queue 238-1, a second odd-numbered queue 238-2, a third odd-numbered queue 238-3 and a fourth odd-numbered queue 238-4 respectively for each of the four transfer address groups created by the dividing. In this case, referring to the input queue unit 230 for each of the transfer addresses, taking, for example, a first transfer address group as an example, the unit 230 for the first transfer address group consists of two (2) queues that are the first even-numbered queue 236-1 into which a packet is written when the reception timing of the header of the packet and the words of the packet following the header is even-numbered reception timing of the external clock frequency, and the first odd-numbered queue 238-1 into which a packet is written when the reception timing is odd-numbered reception timing. Similarly, the second transfer address group consists of two (2) queues that are the second even-numbered queue 236-2 and the second odd-numbered queue 238-2, the third transfer address group consists of two (2) queues that are the third even-numbered queue 236-3 and the third odd-numbered queue 238-3, and the fourth transfer address group consists of two (2) queues that are the fourth even-numbered queue 236-4 and the fourth odd-numbered queue 238-4. Furthermore, each of the queues 236-1 to 236-4 and 238-1 to 238-4 provided to the input queue unit 230 uses a register file that can be written and read in one (1) clock cycle, and is adapted to consist of eight (8)-stage packet storage sectors to allow up to eight (8) packets to be stored therein.

FIG. 2 shows latch timing of a packet for which the reception timing of the header thereof is even-numbered reception timing of the external clock, and writing of the packet into the input queue unit, in terms of the even-numbered latch unit 200, the odd-numbered latch unit 202, the first even-numbered queue 236-1 and the first odd-numbered queue 238-1 of the first address transfer group of FIG. 2. However, the even-numbered latch unit 200 and the odd-numbered latch unit 202 are respectively shown as one (1) latch for simplification of the description though those latch units 200 and 202 respectively has a header latch and a data latch. In FIG. 2, it is assumed that a packet comprising a header H and data words D0 to D7 and having the length equal to the length of nine (9) words is received synchronizing with the external clock. In this case, the header H and the words D1, D3, D5 and D7 are respectively received at even-numbered timing of the external clock and, therefore, are inputted into the even-numbered latch unit 200 one after another while the words D0, D2, D4 and D6 are respectively received at odd-numbered timing of the external clock and, therefore, are inputted into the odd-numbered latch unit 202 one after another. Thus, the even-numbered latch unit 200 and the odd-numbered latch unit 202 latch the words of the received packet including the header one after another by two (2) words at each time, and write the header and the words by two (2) words at each time into the first even-numbered queue 236-1 and the first odd-numbered queue 238-1 using the paths 215 and 225 alternately between the latches. The word D7 at the end of the packet is written as "one (1)-word writing" into the first even-numbered queue 236-1.

FIG. 3 shows latch timing of a received packet for which the reception timing of the header thereof is odd-numbered reception timing of the external clock, and writing of the packet into the input queue unit. In this case, the header H and the words D1, D3, D5 and D7 are respectively received at odd-numbered timing of the external clock and, therefore, are inputted into the odd-numbered latch unit 202 one after another while the words D0, D2, D4 and D6 are respectively received at even-numbered timing of the external clock and, therefore, are inputted into the even-numbered latch unit 200 one after another. As to the header H at the head of the received packet, because no data are present in the even-numbered latch unit 200 when the header H is latched by the odd-numbered latch unit 202, the header H is written as one (1)-word writing into the first odd-numbered queue 238-1. As to the words D0 to D7 of the packet following the header H, because the words D0 to D7 are latched by two (2) words at each time one after another by the even-numbered latch unit 200 and the odd-numbered latch unit 202, the words D0 to D7 are written into the first even-numbered queue 236-1 and the first odd-numbered queue 238-1 by two (2) words at each time using the paths 215 and 225 alternately for each of the latches. However, in this writing of a received packet into a conventional input queue unit, in the case where packets addressed to the same destination and respectively having the length equal to the length of odd-number words are sequential, a problem that the throughput is reduced occurs because voids may exist between packets when packets are read and transferred from the input queue unit depending on the timing to write the packets into queues.

FIG. 4 shows the state of writing into the first even-numbered queue 236-1 and the first odd-numbered queue 238-1 when packets addressed to the same destination and having the length equal to the length of five (5) words are sequentially received at even-numbered timing of the external clock. As to the first received packet, because a header H and words D1 and D3 of the packet are received at even-numbered timing of the external clock, the header H and the words D1 and D3 are written into the first even-numbered queue 236-1. Because words D0 and D2 of the packet are received at odd-numbered timing of the external clock, the words D0 and D2 are written into the first odd-numbered queue 238-1. The same process is applied also to the next received packet. When the packets are read from the input queue unit that stores the packets received sequentially at even-numbered timing of the external clock as described above, the packets are read setting read pointers P1 to P3. In this case, as to the read pointers P1 and P2, reading is parallel reading of two (2) words. However, as to the last data D3 of the packet, reading is one (1)-word reading by the read pointer P3 and, therefore, avoid 242 which contains no data is generated between the packets including a read packet 240 when the packets are read sequentially. Therefore, the throughput is reduced.

FIG. 5 shows the case where packets are read from the input queue unit that stores the packets which are addressed to the same destination and have been received at odd-numbered timing of the external clock. Though the packets are read setting the read pointers P1 to P3, the reading of the header H by the pointer read P1 is one (1)-word reading and, therefore, a void 246 which contains no data is generated between the packets including a read packet 244 when the packets are read sequentially. Therefore, the throughput is reduced. Programs executable by processors to control cross bar apparatuses are usually stored on computer readable storage media, such as RAM, ROM, CDs, etc.

SUMMARY OF THE INVENTION

According to the present invention there is provided a cross bar apparatus that improves the throughput of packet transfer through an input queue unit, at the packet word level, and a control method and a program thereof. The present invention provides a cross bar apparatus that is adapted to set the frequency of an internal clock thereof at ½ of the frequency of an external clock used for transferring packets mutually between a plurality of modules and to configure the internal bus width thereof to be two (2) times as wide as an external bus width, and that reads the received packets after storing and classifying the packets by destination, the cross bar apparatus comprising:

a packet receiving unit receiving packets transferred word by word synchronizing with the external clock as well as dividing a plurality of words of the packets including headers into those at even-numbered reception timing and those at odd-numbered reception timing of the external clock, and outputting the words and the headers in parallel synchronizing with the internal clock;

an even-numbered latch unit latching the words of the packets at even-numbered reception timing outputted from the packet receiving unit;

an odd-numbered latch unit latching the words of the packets at odd-numbered reception timing outputted from the packet receiving unit;

even-numbered queues respectively for each destination, each even-numbered queue including a plurality of stages of multi-stage packet storage sectors to be written into with, packet by packet, the words of the packet at even-numbered reception timing outputted from the even-numbered latch unit;

odd-numbered queues respectively for each destination, each odd-numbered queue including a plurality of stages of multi-stage packet storage sectors to be written into with, packet by packet, the words of the packet at odd-numbered reception timing outputted from the odd-numbered latch unit;

a bypass unit bypassing the even-latch unit;

a swap circuit unit swapping outputs of the even-numbered latch unit and the bypass unit to the odd-numbered queue unit as well as swapping an output of the odd-numbered latch unit to the even-numbered queue unit;

a write control unit, when a plurality of packets are received sequentially, writing words of the packets such that headers of the received packets are respectively arranged alternately in each of the packet storage sectors of the even-numbered queue and the odd-numbered queue between these queues; and a read control unit reading in parallel the words of the packets by two (2) words at each time from the even-numbered queue and the odd-numbered queue.

The reception timing of a header of a packet received intermittently and the reception timing of a header of the packet at the head of packets received sequentially is set at even-numbered reception timing of the external clock. When a plurality of packets are received intermittently or sequentially, the write control unit writes words of the packets such that headers of odd-numbered received packets are arranged one after another in the odd-numbered-stage packet storage sectors of the even-numbered queue, and headers of even-numbered received packets are arranged one after another in the even-numbered-stage packet storage sectors of the odd-numbered queue. When the cross bar apparatus comprises eight (8)-stage-configured packet storage sectors as the even-numbered queue and the odd-numbered queue, the write control unit write the words of the packets such that the headers of the first, third, fifth and seventh received packets are arranged one after another in first, third, fifth and seventh packet storage sectors of the even-numbered queue, and the headers of the second, fourth, sixth and eighth received packets are arranged one after another in second, fourth, sixth and eighth packet storage sectors of the odd-numbered queue. The write control unit executes the following operations when packets addressed to different destinations are received intermittently or sequentially.

Case 1

In the case where the headers of the received packets are at even-numbered reception timing and the packet storage sector is an odd-numbered stage of the even-numbered queue and the odd-numbered queue, the write control unit writes the words of the packets including the headers at the even-numbered reception timing latched by the even-numbered latch unit into the odd-numbered-stage packet storage sectors in the even-numbered queue as well as writes the words of the packets at the odd-numbered reception timing latched by the odd-numbered latch unit into the odd-numbered-stage packet storage sectors in the odd-numbered queue.

Case 2

In the case where the headers of the received packets are at even-numbered reception timing and the packet storage sector is an even-numbered stage of the even-numbered queue and the odd-numbered queue, the write control unit swaps and writes the words of the packets including the headers at the even-numbered reception timing latched by the even-numbered latch unit into the even-numbered-stage packet storage sectors in the odd-numbered queue as well as swaps and writes the words of the packets at the odd-numbered reception timing latched by the odd-numbered latch unit into the even-numbered-stage packet storage sectors in the even-numbered queue.

The write control unit executes the following operations when packets addressed to different destinations are received intermittently or sequentially.

Case 3

In the case where the headers of the received packets are at odd-numbered reception timing and the packet storage sectors of the even-numbered queue and the odd-numbered queue are in odd-numbered stage, the write control unit swaps and writes the words of the packets including headers at odd-numbered reception timing latched by the odd-numbered latch unit into the packet storage sectors at odd-numbered stages in the even-numbered queue as well as writes the words of the packets at even-numbered reception timing obtained by swapping after bypassing by the bypass unit into odd-numbered-stage packet storage sectors in the odd-numbered queue.

Case 4

In the case where the headers of the received packets are at odd-numbered reception timing and the packet storage sectors of the even-numbered queue and the odd-numbered queue are in even-numbered stage, the write control unit writes the words of the packets including headers at odd-numbered reception timing latched by the odd-numbered latch unit into the packet storage sectors at odd-numbered stages in the odd-numbered queue as well as writes the words of the packets at even-numbered reception timing bypassed by the bypass unit into odd-numbered-stage packet storage sectors in the even-numbered queue.

Three (3)-Words Simultaneous Writing

When a first destination packet having the header at even-numbered reception timing and, following the first destination packet, a second destination packet having the header at odd-numbered reception timing and addressed to a different destination from that of the first destination packet are received sequentially, as to the boundary portion between the first destination packet and the second destination packet, the write control unit:

(1) writes the last word of the first destination packet latched by the even-numbered latch unit into an even-numbered queue corresponding to the first destination;

(2) swaps and writes the header of the second destination packet latched by the odd-numbered latch unit into an even-numbered queue corresponding to the second destination; and (3) swaps and writes the word of the packet next to the header of the second destination packet obtained from the first bypass unit into an odd-numbered queue corresponding to the second destination, to thus execute three (3)-words-of-the-packet simultaneous writing.

When packets addressed to the same destination are received sequentially, the write control unit executes the following operations.

Case 5

In the case where the headers of the received packets are at even-numbered reception timing and the packet storage sectors of the even-numbered queue and the odd-numbered queue are in odd-numbered stage, the write control unit writes the words of the packets including headers at even-numbered reception timing latched by the even-numbered latch unit into the packet storage sectors at odd-numbered stages in the even-numbered queue as well as writes the words of the packets at odd-numbered reception timing latched by the odd-numbered latch unit into odd-numbered packet sectors in the odd-numbered queue.

Case 6

In the case where the headers of the received packets are at even-numbered reception timing and the packet storage sectors of the even-numbered queue and the odd-numbered queue are in even-numbered stage, the write control unit swaps and writes the words of the packets including headers at even-numbered reception timing latched by the even-numbered latch unit into the packet storage sectors at even-numbered stages in the odd-numbered queue as well as swaps and writes the words of the packets at odd-numbered reception timing latched by the odd-numbered latch unit into packet storage sectors in the even-numbered stages in the even-numbered queue.

When packets addressed to the same destination are received sequentially, the write control unit executes the following operations.

Case 7

In the case where the headers of the received packets are at odd-numbered reception timing, the header of the packet in the previous stage is at even-numbered reception timing and the packet storage sectors of the even-numbered queue and the odd-numbered queue are in odd-numbered stage, the write control unit swaps and writes the words of the packets including headers at odd-numbered reception timing latched by the odd-numbered latch unit into the packet storage sectors in odd-numbered stages in the even-numbered queue as well as swaps and writes the words of the packets at even-numbered reception timing latched by the even-numbered latch unit into odd-numbered packet sectors in the odd-numbered queue.

Case 8

In the case where the headers of the received packets are at odd-numbered reception timing, the header of the packet in the previous stage is at even-numbered reception timing and the packet storage sectors of the even-numbered queue and the odd-numbered queue are in even-numbered stage, the write control unit writes the words of the packets including headers at odd-numbered reception timing latched by the odd-numbered latch unit into the packet storage sectors at even-numbered stages in the odd-numbered queue as well as writes the words of the packets at even-numbered reception timing latched by the even-numbered latch unit into packet storage sectors in the even-numbered stages in the even-numbered queue.

In the case where the headers of the received packets are at odd-numbered reception timing and where the header of the packet in the previous stage is at odd-numbered reception timing, the write control unit executes the following operations.

Case 9

In the case where the packet storage sectors of the even-numbered queue and the odd-numbered queue are in odd-numbered stage, the write control unit swaps and writes the words of the packets including headers at odd-numbered reception timing latched by the odd-numbered latch unit into the packet storage sectors in odd-numbered stages in the odd-numbered queue as well as bypasses using the bypass unit, and swaps and writes the words of the packets at even-numbered reception timing latched by the even-numbered latch unit into odd-numbered packet sectors in the odd-numbered queue.

Case 10

In the case where the packet storage sectors of the even-numbered queue and the odd-numbered queue are in even-numbered stage, the write control unit writes the words of the packets including headers at odd-numbered reception timing latched by the odd-numbered latch unit into the packet storage sectors at even-numbered stages in the odd-numbered queue as well as writes the words of the packets at even-numbered reception timing latched by the even-numbered latch unit into packet storage sectors in the even-numbered stages in the even-numbered queue.

The write control unit writes the two (2) words of the words of the packets in parallel into the even-numbered queue and the odd-numbered queue at any of:

at timing at which two (2) words of the words of the packet including the header are latched by the even-numbered latch unit and the odd-numbered latch unit;

at timing at which two (2) words of the words of the packet including the header are latched and swapped by the even-numbered latch unit and the odd-numbered latch unit; and at timing at which the words of the packets including the header are latched by the odd-numbered latch unit and the words of the packets bypassed are outputted from the bypass unit.

The control unit:

reads the words of the packets in parallel by two (2) words at each time from the packet storage sectors at the odd-numbered stages of the even-numbered queue and the odd-numbered queue;

in a boundary portion with the packet storage sectors at the next even-numbered stage, reads in parallel two (2) words that are the last word in the packet storage sector at the preceding odd-numbered stage and the header in the packet storage sector at a following even-numbered stage;

as to the remaining words of the packet in the packet storage sectors at an even-numbered stage after reading the header, reads the words of the packet in parallel by two (2) words at each time from a position shifted by one (1) word from the packet storage sector at an even-numbered stage in the even-numbered queue and the odd-numbered queue; and thereafter, repeats the above operations.

Method

The present invention provides a method of controlling a cross bar apparatus. The present invention provides a method of controlling a cross bar apparatus that is adapted to set the frequency of an internal clock thereof at ½ of the frequency of an external clock used for transferring packets mutually between a plurality of modules and to configure the internal bus width thereof to be two (2) times as wide as an external bus width, and that reads the received packets after storing and classifying the packets by destination, the method comprising:

a packet receiving step of receiving packets transferred word by word synchronizing with the external clock as well as dividing a plurality of words of the packets including headers into those at even-numbered reception timing and those at odd-numbered reception timing of the external clock, and outputting the words and the headers in parallel synchronizing with the internal clock;

an even-numbered latch step of latching into an even-numbered latch unit the words of the packets at even-numbered reception timing outputted from the packet receiving step;

an odd-numbered latch step of latching into an odd-numbered latch unit the words of the packets at odd-numbered reception timing outputted from the packet receiving step;

even-numbered queue step of writing, packet by packet, the words of the packet at even-numbered reception timing outputted from the even-numbered latch unit, into each even-numbered queue for each destination including a plurality of stages of multi-stage packet storage sectors;

odd-numbered queue step of writing, packet by packet, the words of the packet at odd-numbered reception timing outputted from the odd-numbered latch unit, into each odd-numbered queue for each destination including a plurality of stages of multi-stage packet storage sectors;

a bypass step of bypassing the even-latch unit;

a swap step of swapping outputs of the even-numbered latch unit and the bypass unit to the odd-numbered queue unit as well as swapping an output of the odd-numbered latch unit to the even-numbered queue unit;

a write control step, when a plurality of packets are received sequentially, of writing words of the packets such that headers of the received packets are respectively arranged alternately in each of the packet storage sectors of the even-numbered queue and the odd-numbered queue between these queues; and a read control step of reading in parallel the words of the packets by two (2) words at each time from the even-numbered queue and the odd-numbered queue.

The present invention provides a program executed by a computer of a cross bar apparatus. The program of the present invention is operable to run a computer of a cross bar apparatus that is adapted to set the frequency of an internal clock thereof at ½ of the frequency of an external clock used for transferring packets mutually between a plurality of modules-and to configure the internal bus width thereof to be two (2) times as wide as an external bus width, and that reads the received packets after storing and classifying the packets by destination, to execute:

a packet receiving step of receiving packets transferred word by word synchronizing with the external clock as well as dividing a plurality of words of the packets including headers into those at even-numbered reception timing and those at odd-numbered reception timing of the external clock, and outputting the words and the headers in parallel synchronizing with the internal clock;

an even-numbered latch step of latching into an even-numbered latch unit the words of the packets at even-numbered reception timing outputted from the packet receiving step;

an odd-numbered latch step of latching into an odd-numbered latch unit the words of the packets at odd-numbered reception timing outputted from the packet receiving step;

even-numbered queue step of writing, packet by packet, the words of the packet at even-numbered reception timing outputted from the even-numbered latch unit, into each even-numbered queue for each destination including a plurality of stages of multi-stage packet storage sectors;

odd-numbered queue step of wiring, packet by packet, the words of the packet at odd-numbered reception timing outputted from the odd-numbered latch unit, into each odd-numbered queue for each destination including a plurality of stages of multi-stage packet storage sectors;

a bypass step of bypassing the even-latch unit;

a swap step of swapping outputs of the even-numbered latch unit and the bypass unit to the odd-numbered queue unit as well as swapping an output of the odd-numbered latch unit to the even-numbered queue unit;

a write control step, when a plurality of packets are received sequentially, of writing words of the packets such that headers of the received packets are respectively arranged alternately in each of the packet storage sectors of the even-numbered queue and the odd-numbered queue between these queues; and a read control step of reading in parallel the words of the packets by two (2) words at each time from the even-numbered queue and the odd-numbered queue.

The details of the method and program for controlling the cross bar apparatus will become essentially the same as those of the cross bar apparatus of the present invention. According to the present invention, when a plurality of received packets are stored into an input queue unit one after another, data can be written into queues such that timing for reading the data becomes synchronized, by writing words of the packets such that headers of the packets are arranged alternately in each of packet storage sectors of even-numbered queues and odd-numbered queues and, therefore, gaps in timing can be prevented from occurring when the packets are read. Thereby, packet transfer through input queues can be executed at sequential timing when packets having the length equal to the length of odd-number words are sequentially received. Therefore, the throughput can be improved. The above and other objects, features and advantages of the present invention will become more apparent from the following detailed description with reference to the drawings.

BRIEF DESCRIPTION OF THE DRAWINGS

FIGS. 7A and 7B are circuit block diagrams of the cross bar apparatus of the present invention;

FIGS. 8A and 8B show a circuit diagram of the detailed configuration of a latch unit and an input port of FIGS. 7A and 7B, that is an embodiment of the present invention;

FIG. 9 is an explanatory view of packet transfer of external buses and internal buses in the cross bar apparatus of the present invention;

FIG. 10 is an explanatory view of a queue write process according to the present invention for writing received packets alternately into the even-numbered queue and the odd-numbered queue;

FIGS. 12A and 12B are explanatory views of a queue writing process in the case where received packets addressed to the same destination are sequential;

FIGS. 14A and 14B are explanatory views showing a process of the present invention for sequentially reading packets at even-numbered reception timing from the input queues, compared to a conventional process;

FIGS. 15A and 15B are explanatory views showing a process of the present invention for sequentially reading packets at odd-numbered reception timing from the input queues, compared to a conventional process;

FIGS. 16A and 16B are flowcharts showing a packet writing process into the input queues;

FIG. 16C is a flowchart showing the packet writing process, continued from FIGS. 16A and 16B;

FIGS. 17A and 17B are explanatory views of writing processes of Case 1 and the Case 2 in the flowchart of FIGS. 16A and 16B;

FIGS. 17C and 17D are explanatory views of writing processes of Case 3 and Case 4 in the flowchart of FIGS. 16A and 16B;

FIGS. 17E and 17F are explanatory views of writing processes of Case 7 and Case 8 in the flowchart of FIG. 16C; and FIGS. 17G and 17H are explanatory views of writing processes of Case 9 and Case 10 in the flowchart of FIG. 16C.

DETAILED DESCRIPTION OF THE PREFERRED EMBODIMENT

Figure 1:
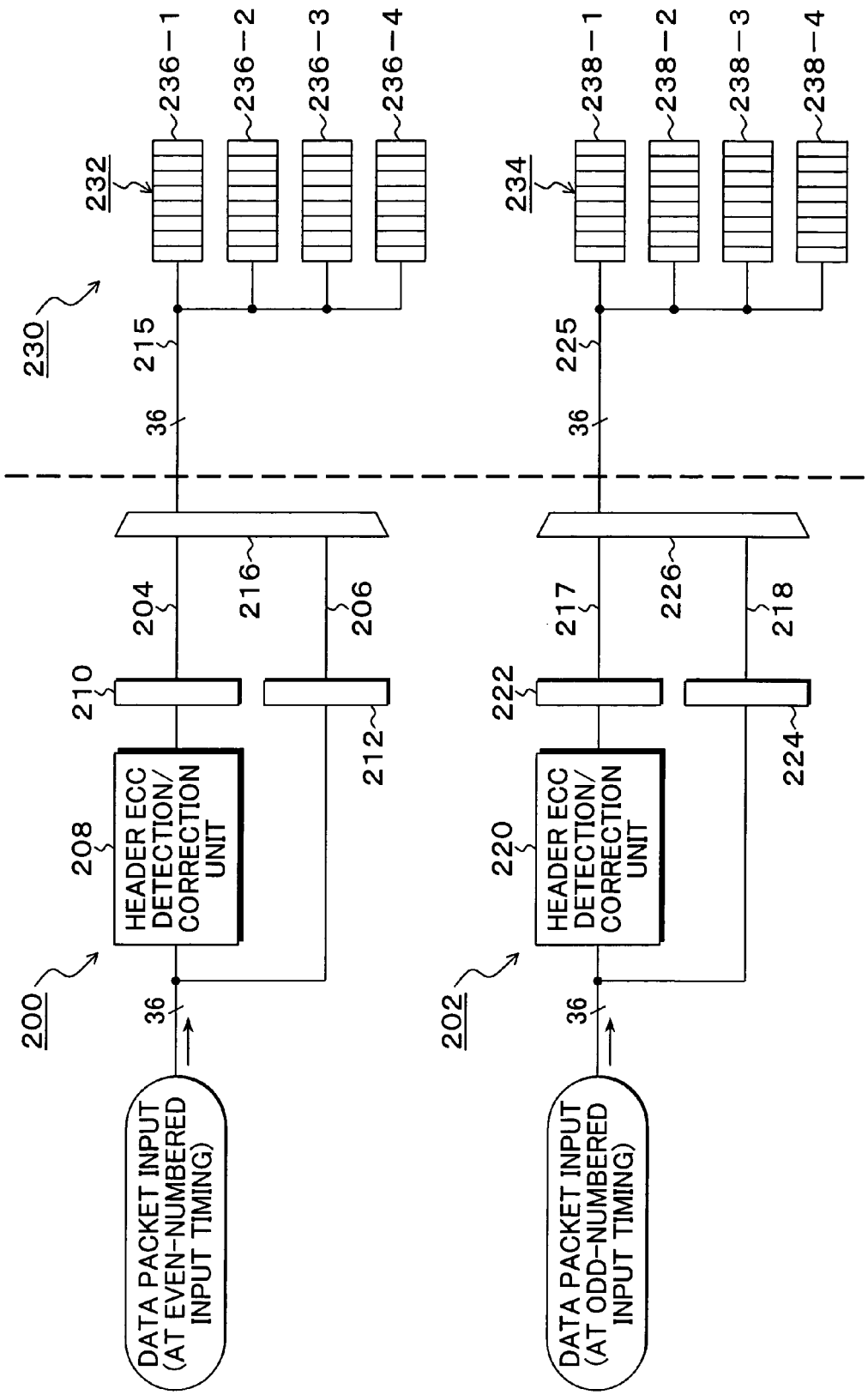
FIG. 1 is a circuit block diagram of an input queue unit provided to a conventional cross bar apparatus.
Figure 2:
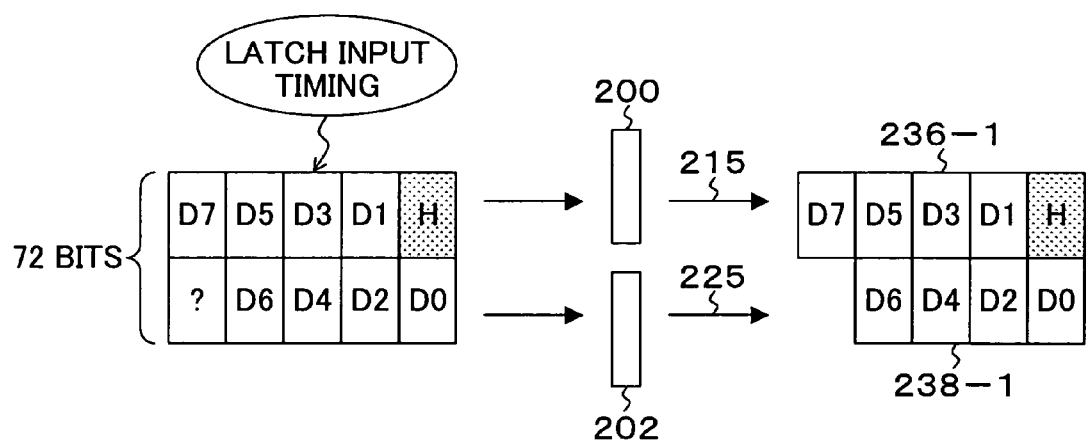
FIG. 2 is an explanatory view of a conventional process for writing a packet at even-numbered reception timing into queues.
Figure 3:
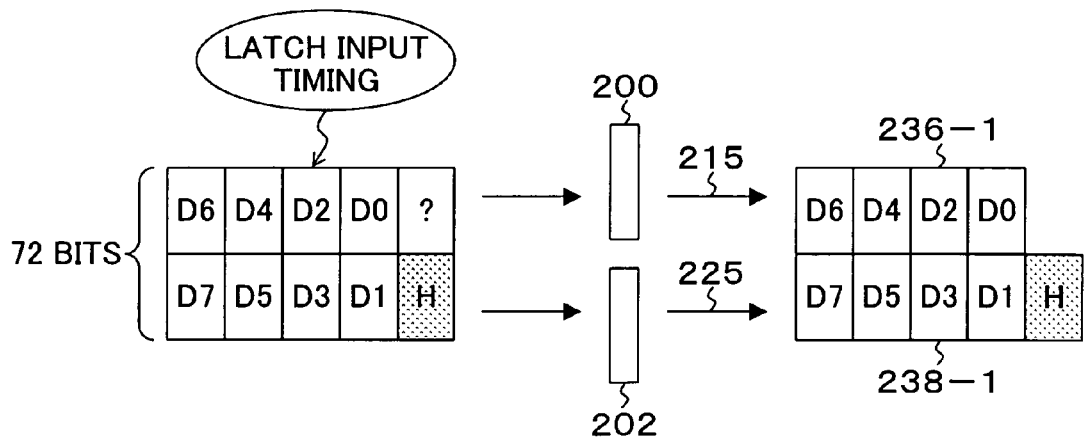
FIG. 3 is an explanatory view of a conventional process for writing a packet at odd-numbered reception timing into queues.
Figure 4:
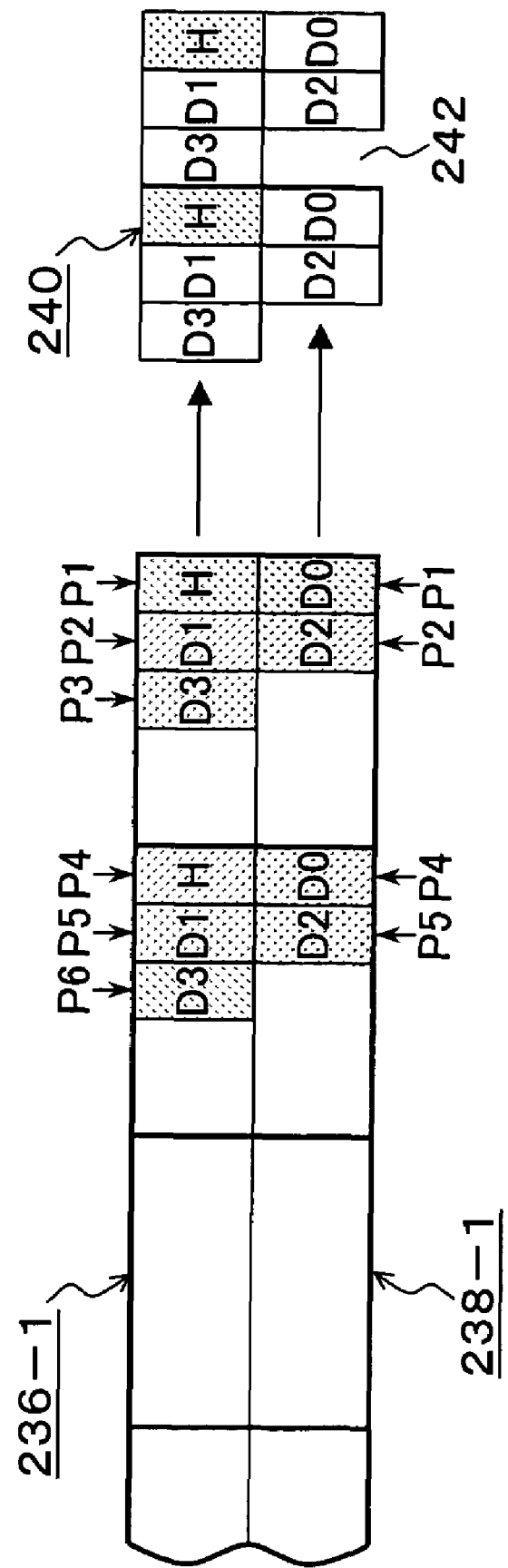
FIG. 4 is an explanatory view of a conventional process for sequentially reading packets at even-numbered reception timing from the input queues.
Figure 5:
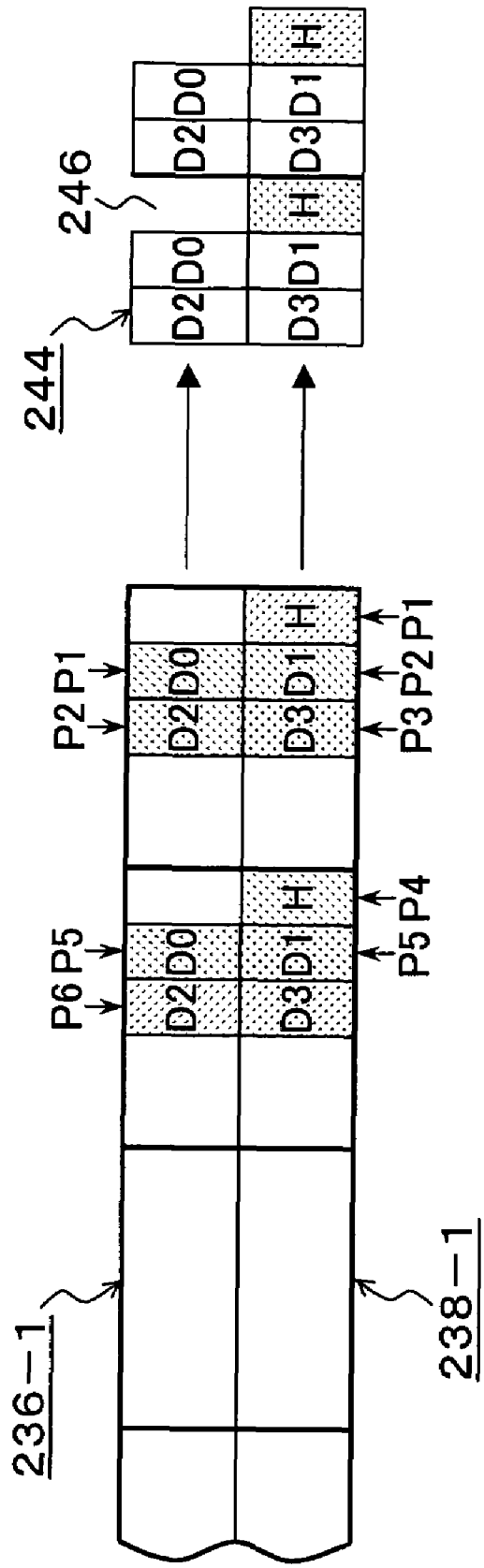
FIG. 5 is an explanatory view of a conventional process for sequentially reading packets at odd-numbered reception timing from the input queues.
Figure 6:
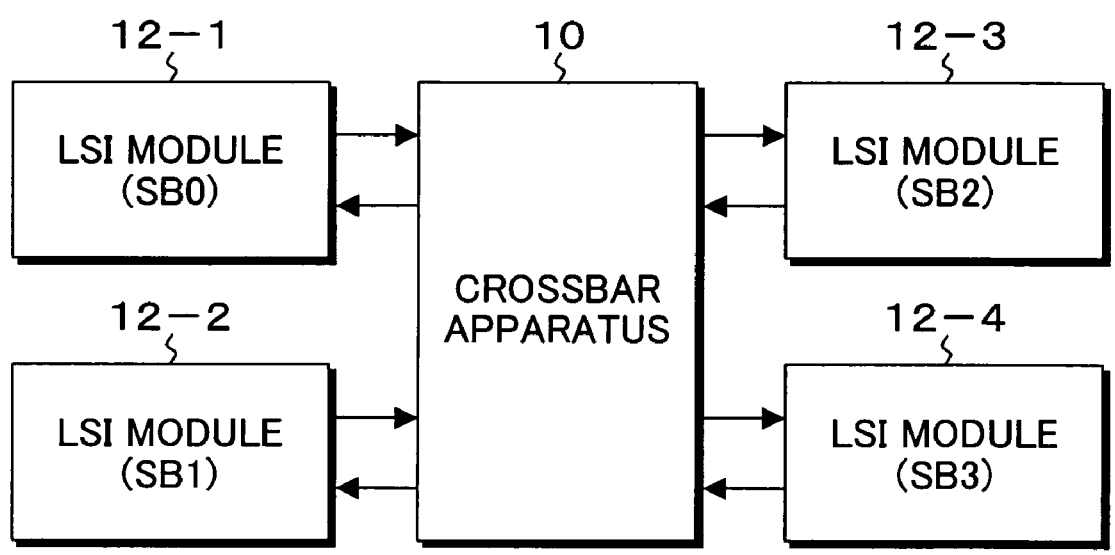
FIG. 6 is an explanatory view of a circuit system using a cross bar apparatus of the present invention.

FIG. 6 is an explanatory view of an information processing system using a cross bar apparatus of the present invention. In FIG. 6, the cross bar apparatus 10 of the present invention, in this example, connects between LSI modules 12-1, 12-2, 12-3 and 12-4 that constitute MPUs or input/output sub-systems, using external buses; receives data packets (hereinafter, referred to simply as "packets") from the LSI modules 12-1, 12-2, 12-3 and 12-4 addressed to different modules including the originating module itself; stores the packets into an input queue unit inside; then, reads the packets from the input queue unit; sorts the packets for each transfer destination; stores the packets into an output queue unit; and, thereafter, transfers the packets to the destinations.

Figure 7B:
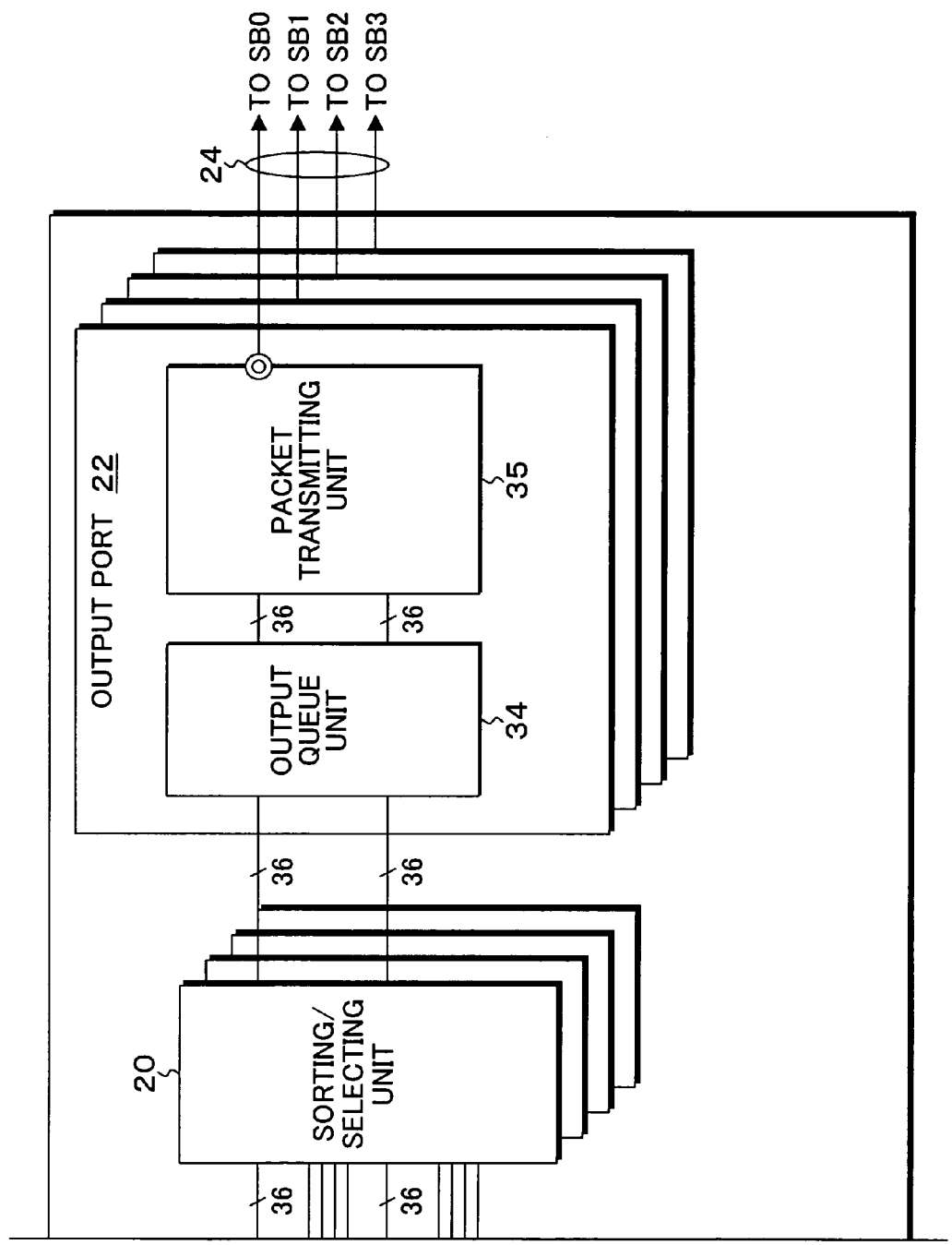

FIGS. 7A and 7B are circuit block diagrams of the cross bar apparatus according to the present invention. The cross bar apparatus 10 comprises an input port 18, a sorting/selecting unit 20 and an output port 22. Into the input port 18, four (4) external buses 16 from the LSI modules 12-1 to 12-4 shown in FIG. 6 are outputted. From the output port 22, external buses 24 for outputting to the LSI modules 12-1 to 12-4 of FIG. 6 are connected. To the input port 18, a packet receiving unit 26, a latch unit 28 and an input queue unit 30 are provided in this order from the side on which the external buses 16 are connected. The external buses 16 connected to the cross bar apparatus 10 transfer the packets from each of the LSI modules word by word of the packets according to the external clock, and the clock frequency of the external busses 16 is, for example, 1.3 GHz and the width of the buses is 36 bits (4 (four) bytes). In contrast, internal buses of the cross bar apparatus 10 transfer the packets according to an internal clock. The clock frequency of the internal clock is 667 MHz which is a half of the frequency of the external clock and the width of the buses is set at 72 bits (8 (eight) bytes) by providing 36-bit buses in parallel. Having received the packets transferred word by word from LSI modules synchronizing with the external clock, the packet receiving unit 26 divides a plurality of words of the packets containing the headers of the packets into those at even-numbered reception timing and those at odd-numbered reception timing, and outputs those words synchronizing with the internal clock and in parallel. The latch unit 28 provided following the packet receiving unit 26 executes latching for writing the headers and the words of the received packets following the headers basically by two (2) words at each time into the input queue unit 30. As to the headers, the latch unit 28 executes ECC detection/correction. To the input queue unit 30, a first input queue unit 36-1, a second input queue unit 36-2, a third input queue unit 36-3 and a fourth input queue unit 36-4 are provided corresponding to the four (4) LSI modules 12-1 to 12-4 that are the destinations. In addition, each of the input queue units 36-1 to 36-4 comprises two (2) queues that are an odd-numbered queue and an even-numbered queue as shown for the first input queue unit 36-1. In the input queue unit 30, a sorting/selection unit 20 reads the received packets divided for the first input queue unit 36-1 to the fourth input queue unit 36-4 and stored for each destination, and outputs the packets to the output port 22 after sorting and selecting the packets for each of the destinations. To the output port 22, an output queue unit 34 and a packet transmitting unit 35 are provided. After storing the packets in order to adjust the timing for transferring the packets to the destinations, the output queue unit 34 reads the packets sequentially. Then, the packet transmitting unit 35 restructures the packets as packets that synchronize with the external clock, and the packets are transferred from the external buses 24 to the destination LSI modules.

Figure 8B:
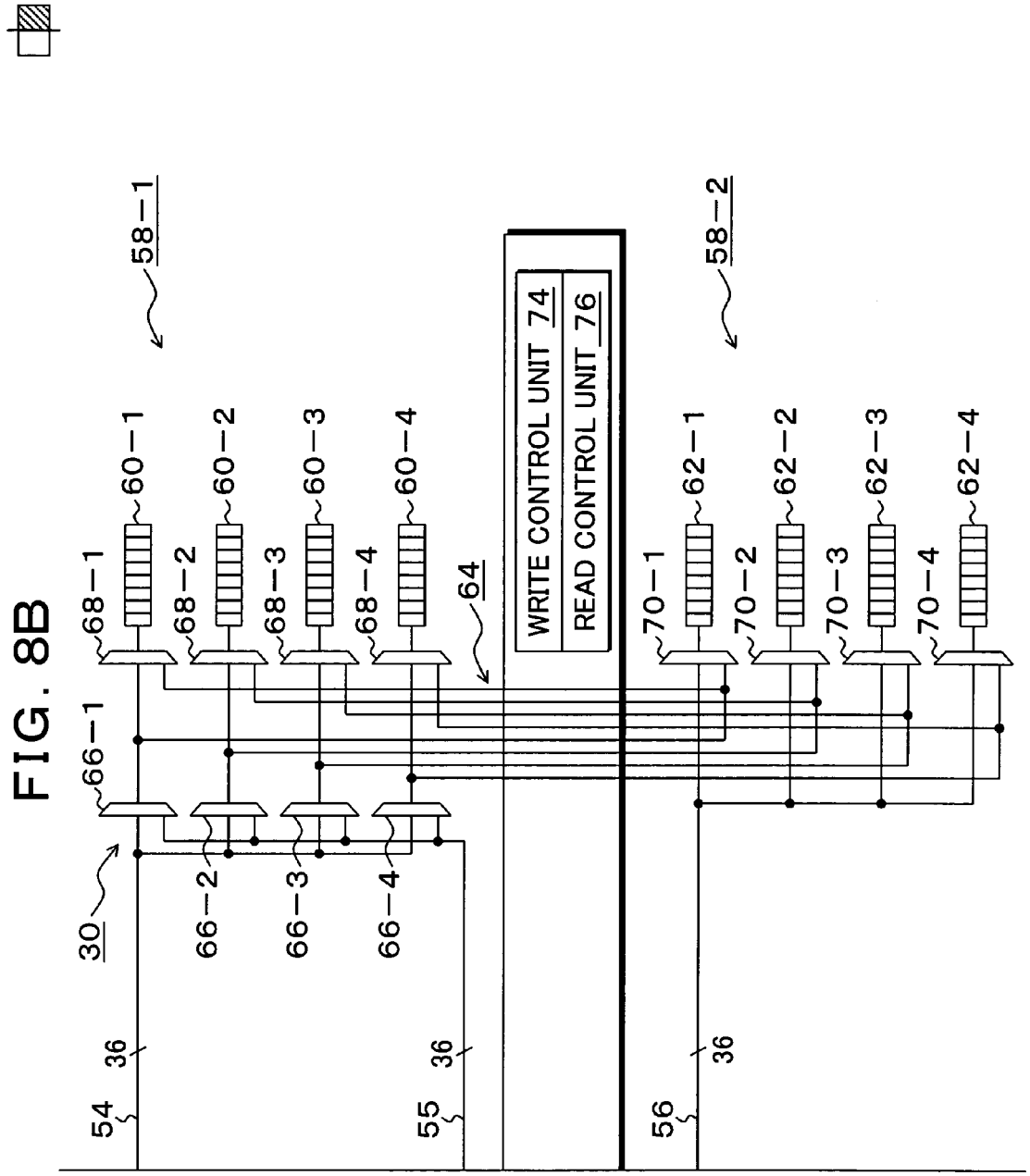

FIGS. 8A and 8B show a circuit block diagram of the detailed configuration of the latch unit 28 and the input queue unit provided to the input port of FIGS. 7A and 7B that is an embodiment of the present invention. In FIG. 8A, the latch unit 28 consists of an even-numbered latch unit 28-1 and an odd-numbered latch unit 28-2. The input queue unit 30 consists of an input even-numbered queue unit 58-1 and an input odd-numbered queue unit 58-2. The even-numbered latch unit 28-1 branches the internal bus after a latch 37-1 at an input stage, into three (3) paths that are a header portion passing path 40-1, a data portion passing path 42-1 and a bypass unit 52. A header detection/correction unit 44-1 and a header latch 46-1 are provided to the header portion passing path 40-1. A data latch 48-1 is provided to the data portion passing path 42-1. The outputs of the header latch 46-1 and the data latch 48-1 are inputted to a selector 50-1. A path from the selector 50-1 is supplied to the input even-numbered queue unit 58-1 as an ordinary path 54. The bypass unit 52 bypasses the header latch 46-1 and the data latch 48-1 and, thereby, data at timing one period after the timing at which the header has been latched by the header latch 46-1 can be outputted from the bypass unit 52. Similarly, the data latch 48-1 is adapted to be able to output the words of the packet that can be obtained at the next timing in the state where the words of the packet are retained. A path of the bypass unit 52 to the input queue unit 30 is shown as a bypass path 55. On the other hand, the odd-numbered latch unit 28-2 branches an internal bus from a latch 37-2 at the input stage into two (2) internal buses that are a header portion passing path 40-2 and a data portion passing path 42-2. A header ECC detection/correction unit 44-2 and a header latch 46-2 are provided to the header portion passing path 40-2. A data latch 48-2 is provided to the data portion passing path 42-2. Those paths 40-2 and 42-2 are inputted into a selector 50-2 and an output of the selector 50-2 is connected with an input odd-numbered queue unit 58-2 as an ordinary path 56. This odd-numbered latch unit 28-2 is configured similarly to the even-numbered latch unit 28-1 except that the unit 28-2 is not provided with the bypass unit 52. To the input even-numbered queue unit 58-1 provided to the input queue unit 30, a first even-numbered queue 60-1, a second even-numbered queue 60-2, a third even-numbered queue 60-3 and a fourth even-numbered queue 60-4 are provided corresponding to the LSI modules 12-1 to 12-4 that are the destinations shown in FIG. 6, and are inputted with the ordinary path 54 from the even-numbered latch unit 28-1 in parallel. On the other hand, to the input odd-numbered queue unit 58-2, a first odd-numbered queue 62-1, a second odd-numbered queue 62-2, a third odd-numbered queue 62-3 and a fourth odd-numbered queue 62-4 are also provided corresponding to the LSI modules 12-1 to 12-4 of FIG. 6, and are inputted with the ordinary path 56 from the odd-numbered latch unit 28-2 in parallel. Furthermore, a swap circuit unit 64 is provided to the input queue unit 30. The swap circuit 64 consists of selectors 66-1 to 66-4 and selectors 68-1 to 68-4 provided on the side of the input even-numbered queue unit 58-1, selectors 70-1 to 70-4 provided on the side of the input odd-numbered queue unit 58-2, and path connection for these selectors on the input and output sides of these selectors. That is, the ordinary path 54 from the even-numbered latch unit 28-1 is inputted through these lectors 66-1 to 66-4 in parallel respectively into the selectors 68-1 to 68-4 as well as is branched to the side of the input odd-numbered queue unit 58-2 and is inputted into the selectors 70-1 to 70-4. Similarly, the ordinary path 56 from the odd-numbered latch unit 28-2 is inputted into the selectors 70-1 to 70-4 as well as is branched to the side of the input even-numbered queue unit 58-1 and, thereafter, is inputted into the selectors 68-1 to 68-4. Thereby, in addition to storing packets from the ordinary path 54 into the input even-numbered queue unit 58-1 that is the original storage unit, the packets can be stored being switched to the side of the input odd-numbered queue unit 58-2 by swapping operation (switching operation) by the swap circuit unit 64. Same operation is applied to the ordinary path 56 from the odd-numbered latch unit 28-2. Furthermore, similarly, as to the bypass path 55 from the bypass unit 52 provided to the even-numbered latch unit 28-1, in addition to the storage on the side of the input even-numbered queue unit 58-1, packets can be stored being swapped to the side of the input odd-numbered queue unit 58-2 by inputting the bypass path 55 into the selectors 66-1 to 66-4. In this configuration, each of the first even-numbered queue 60-1 to the fourth even-numbered queue 60-4 and the first odd-numbered queue 62-1 to the fourth odd-numbered queue 62-4 consists of a FIFO buffer which works on a first-in-first-out basis, and comprises an eight (8)-stage packet storage sector that can store eight (8) packets. Reading from and writing into each of the packet storage sector are executed for each header and each word that constitute a packet, and reading and writing of each word are a register file of one (1) read and one (1) write that can read and write in one (1) clock cycle of the internal clock. Furthermore, a control unit 72 is provided to the latch unit 28 and the input queue unit 30. To the control unit 72, a write control unit 74 and a read control unit 76 for the input queue unit 30 are provided. The write control unit 74 executes writing word by word such that, when a plurality of packets have been received, a header of each received packet is arranged alternately in each packet storage sector between the even-numbered queue and the odd-numbered queue. Therefore, in the present invention, a header of a packet at the head is necessarily at even-numbered reception timing of the external clock as to packets received sequentially or intermittently and, therefore, the header of the packet at the head is stored in a corresponding even-numbered queue on the side of the input even-numbered queue unit 58-1. Then, because the packet at the head is stored in the even-numbered queue, the headers of a second packet and following packets are stored alternately such that the next header is stored in an odd-numbered queue, the one after next is stored in an even-numbered queue, the one after that is stored in an odd-numbered queue, etc. Therefore, as shown in the first even-numbered queue 60-1 to the fourth even-numbered queue 60-4 in the figure, for the eight (8)-stage packet storage sectors, the headers H are arranged at a first stage, a third stage, a fifth stage and a seventh stage that are odd-numbered stages. In contrast, as to the first odd-numbered queue 62-1 to the fourth odd-numbered queue 62-4, the headers H are arranged at a second stage, a fourth stage, a sixth stage and an eighth stage that are even-numbered stages, among the eight (8)-stage packet storage sectors. Therefore, observing, for example, the first even-numbered queue 60-1 and the first odd-numbered queue 62-1 corresponding to the same destination, as to the first to the eighth storage sectors, the headers H are stored alternately between the even-numbered queue and the odd-numbered queue starting from the even-numbered queue. The alternate writing of the headers of the received packets into the even-numbered queue and the odd-numbered queue corresponding to the same destination as described above does not generate any void timing between the packets when the packets are read sequentially from the even-numbered queue and the odd-numbered queue and, therefore, realizes writing that enables sequential reading by two (2) words at each time. The read control unit 76 provided to the control unit 70 reads in parallel the words of the packets by two (2) words at each time from the even-numbered queue and the odd-numbered queue corresponding to the same destination. This parallel reading is due to the writing executed such that, when written by the write control unit 74, the headers are arranged alternately in the even-numbered queue and the odd-numbered queue with the even-numbered queue side written first and, therefore, two (2)-word reading can be sequentially executed without generating any void timing between the packets when reading is sequentially executed in parallel from the even-numbered queue and the odd-numbered queue.

FIG. 9 is an explanatory view of packet transfer of the external buses and internal buses in the cross bar apparatus of the present invention. In FIG. 9, the external buses 16 transfer packet data 80 word by word using, for example, a 1.3 GHz clock as the external clock 78. The bus width of the external buses 16 is four (4) bytes (36 bits) and, in this example, the external buses 16 sequentially transfer eight (8) packets of packets 82-1 to 82-8. Each of the packets 82-1 to 82-8 consists of a header H and four (4) words indicated by numerals 0 to 3 of words D0 to D3 of the packet. As to reception timing of the packet data 80, reception timing of the header H of the packet 82-1 at the head by the external clock 78 is necessarily even-numbered reception timing 84 and, therefore, reception timing of the word D0 of the packet coming next is odd-numbered reception timing 86. When packets having the length equal to the length of odd-number words as above are received sequentially, reception timing is varied alternately such that the header H of the second packet 82-2 is at odd-numbered reception timing 86, the header H of the third packet 82-3 is at even-numbered reception timing 84. As shown by an internal clock 88, an internal bus 38 of the cross bar apparatus has the frequency of 667 MHz that is a half of the frequency of the external clock 78 and has the bus width of eight (8) bytes (72 bits) that is two (2) times as large as that of the external clock 78. Therefore, the packets 82-1 to 82-8 transferred from the external buses 16 are, in the internal bus 38, transferred as parallel packet data converted such that one (1) bus width is formed by two (2) words. At this moment, the header H and the words D1 and D3 of the packet 82-1 at the head are at the even-numbered reception timing 84 in the external buses 16. Therefore, the header H and the words D1 and D3 are transferred by the internal bus on the even-numbered side. Then, the numerals 0 to 3 represents the words D0 to D3 of the packet.

FIG. 10 is an explanatory view of the queue write process according to the present invention for writing the received packets alternately into the even-numbered queue and the odd-numbered queue. FIG. 10 shows latch input timing 90 for the even-numbered latch unit 28-1 and the odd-numbered latch unit 28-2 of FIG. 8A, and the result of the writing into the even-numbered queue 60 and the odd-numbered queue 62 thereafter. The latch input timing 90 is packet data for the case where the sequential eight (8) packets 82-1 to 82-8 addressed to the same destination shown in the internal bus 38 of FIG. 9 have been received, and is written in parallel into the even-numbered queue 60 and the odd-numbered queue 62 by two (2) words at each time using the ordinary buses 54 and 56 of FIGS. 8A and 8B. That is, the even-numbered queue 60 and the odd-numbered queue 62 comprises packet storage sectors 92-1 to 92-8 configured in eight (8) stages. At timing at which the header H and the words D0 of the packet 82-1 at the head are latched by the header latch 46-1 and the data latch 48-2 of FIG. 8A as latch input timing, the header H and the word D0 are written into the head position in the packet storage sector 92-1 at the first stage of the even-numbered queue 60 and the odd-numbered queue 62 by designation of a write pointer P1. Then, the word D1 of the packet on the even-numbered side and the word D2 of the packet on the odd-numbered side of the packet 82-1 are written in parallel by settings of a write pointer P2. Then, on the packet boundary between the packet 82-1 and the next packet 82-2, the last word D3 of the packet on the even-numbered side of the packet 82-1 and a header H of the next packet 82-2 are written in parallel into the packet storage sector 92-1 of the even-numbered queue 60 and the next packet storage sector 92-2 of the odd-numbered queue 62 by the write pointer P3. Then, after executing parallel writing of the words D0 and D1 of the packet 82-2, on the packet boundary between the packet 82-2 and the next packet 82-3, the last word D3 of the packet 82-2 and the header H of the next packet 82-3 are written in parallel. Following this, the same operation is repeated for the remaining packets 82-3 to 82-8. As a result, in the even-numbered queue 60 and the odd-numbered queue 62 that store the eight (8) packets 82-1 to 82-8, a storage state can be created where the headers H are written into the packet storage sectors 92-1 to 92-8 in this order alternately between the even-numbered queue 60 and the odd-numbered queue 62 starting on the side of the even-numbered queue 60. In this case, for the packet write process of the present invention, the following three (3) queue writing patterns can be listed including the packet writing shown in FIG. 10 for which headers are at even-numbered reception timing.

(1) A first case where the headers of the packets are at even-numbered reception timing of the external clock.

(2) A second case where the headers of the packets are at odd-numbered reception timing of the external clock, and no packet is present at the previous stage or packets at even-numbered reception timing and addressed to different destinations from that of the packets are present at the previous stage.

(3) A third case where the headers of the packets are at odd-numbered reception timing of the external clock and packets at even-numbered reception timing and addressed to the same destination as that of the packets are present at the previous stage.

Figure 11A:
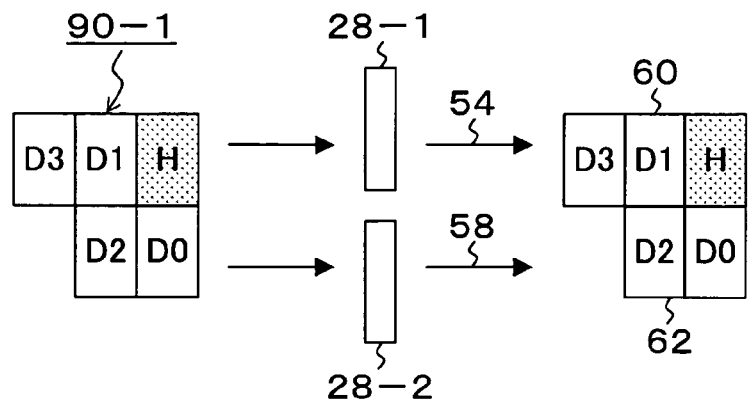
FIGS. 11A to 11C are explanatory views of queue write patterns according to the present invention, that are classified by even-numbered reception timing and odd-numbered reception timing of headers.

FIG. 11A shows the first case where the reception timing according to the external clock is even-numbered reception timing. In this case, observing the latch input timing 90-1, the header H at the even-numbered reception timing and the word D0 at the odd-numbered reception timing of the packet are inputted in parallel and, after being latched by the even-numbered latch unit 28-1 and the odd-numbered latch unit 28-2, are written by the ordinary paths 54 and 58 in parallel into the even-numbered queue 60 and the odd-numbered queue 62. As to the headers, in practice, as shown in FIG. 8A, the headers are latched by the header latches 46-1 and 46-2, and, as to the words of the packets, the words are latched by the data latches 48-1 and 48-2. However, for simplicity of the description, those latches are simply represented by the even-numbered latch unit 28-1 and the odd-numbered latch unit 28-2. In addition, the first case of FIG. 11A shows the case where a packet is received alone. However, the case where packets are sequential is as shown in FIG. 10.

Figure 11B:
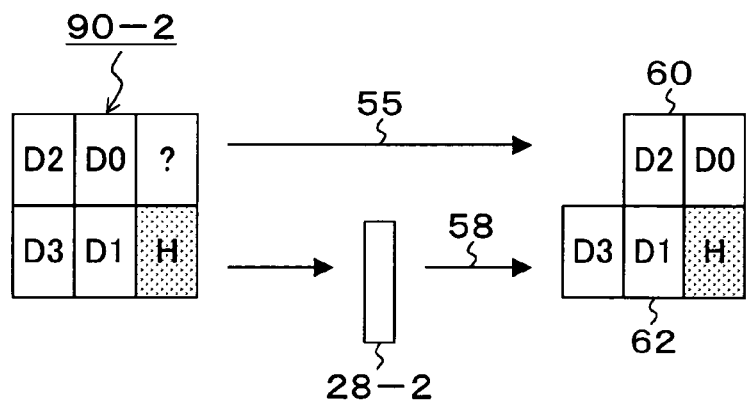

FIG. 11B shows the second case and, in this case, the header H is at odd-numbered reception timing of the external clock and, thereby, the header H is transferred by the internal bus on the odd-numbered side as shown in the latch input timing 90-2. In this case, when no packet precedes the packet at odd-numbered reception timing, the word D0 of the packet at the next even-numbered reception timing is obtained by the path 55 from the bypass unit 52 at the timing the header H is latched by the odd-numbered latch unit 28-2. Therefore, the header H and the word D0 of the packet are written in parallel into the even-numbered queue 60 and the odd-numbered queue 62 using this bypass path 55. As to the remaining words D1 and D2 of the packet, similarly, these words D1 and D2 are written in parallel using the path 58 and the bypass path 55 and the last word D3 of the packet is written by the path 58. Furthermore, in the second case, packets having the headers at even-numbered reception timing and addressed to different destinations from that of a packet are present at the previous stage of the packet having the header portion at odd-numbered reception timing, a three (3)-word simultaneous writing process for three (3) queues disclosed later in the description is executed.

Figure 11C:
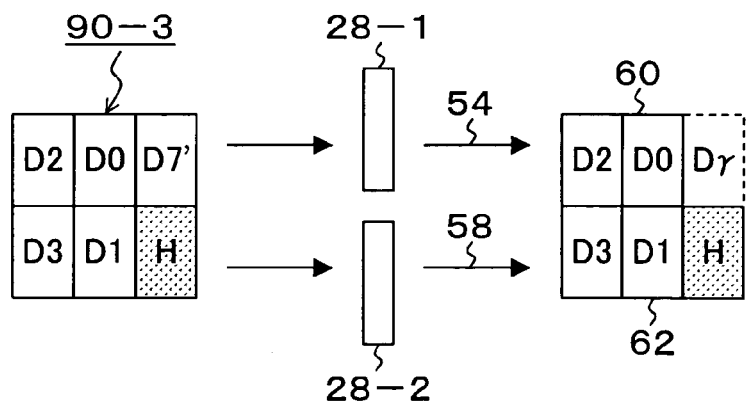

FIG. 11C shows the third case and, as shown in latch input timing 90-3, is the case where a header portion of a packet is at odd-numbered reception timing of the external clock and is the case where packets having the headers at even-numbered reception timing and addressed to the same destination as that of the packet are present at the previous stage. In this case, at timing the header H is latched by the odd-numbered latch unit 28-2, the last word D γ of the packet at the previous stage is retained by the even-numbered latch unit 28-1 at timing immediately before the timing and, therefore, after writing the data D γ of the packet and the header H in parallel into the even-numbered queue 60 and the odd-numbered queue 62 using the ordinary paths 54 and 58, the remaining words D0, D1, D2 and D3 are written by two (2) words at each time in parallel using the ordinary paths 54 and 58.

FIGS. 12A and 12B are explanatory views of a queue writing process in the case where received packets addressed to the same destination are sequential. FIG. 12A shows latch input timing, and the packet 82-1 at the head and the second packet 82-2 are in the first input queue unit 36-1 for the same destination. In such a case, as to the packet 82-1 at the head, the writing according to the first case of FIG. 11A is executed to a fist packet storage sector 92-11 of the first even-numbered queue 60-1 and the first odd-numbered queue 62-1. Writing of the next packet 82-2 addressed to the same destination is the writing according to the third case of FIG. 11C and the writing is executed to a second packet storage sector 92-12 of the first even-numbered queue 60-1 and the first odd-numbered queue 62-1. In this case, as the writing for the boundary portion between the packets 82-1 and 82-2, as indicated by the write pointer P3, parallel writing of the last word D3 of the preceding packet 82-1 and the header H of the following packet 82-2 is executed.

Figure 13A:
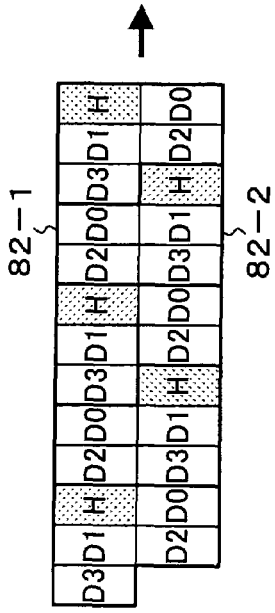
FIGS. 13A and 13B are explanatory views of three (3)-word simultaneous writing for the packet boundary in the case where packets addressed to different destinations and at odd-numbered reception timing following a packet at even-numbered reception timing are sequential.
Figure 13B:
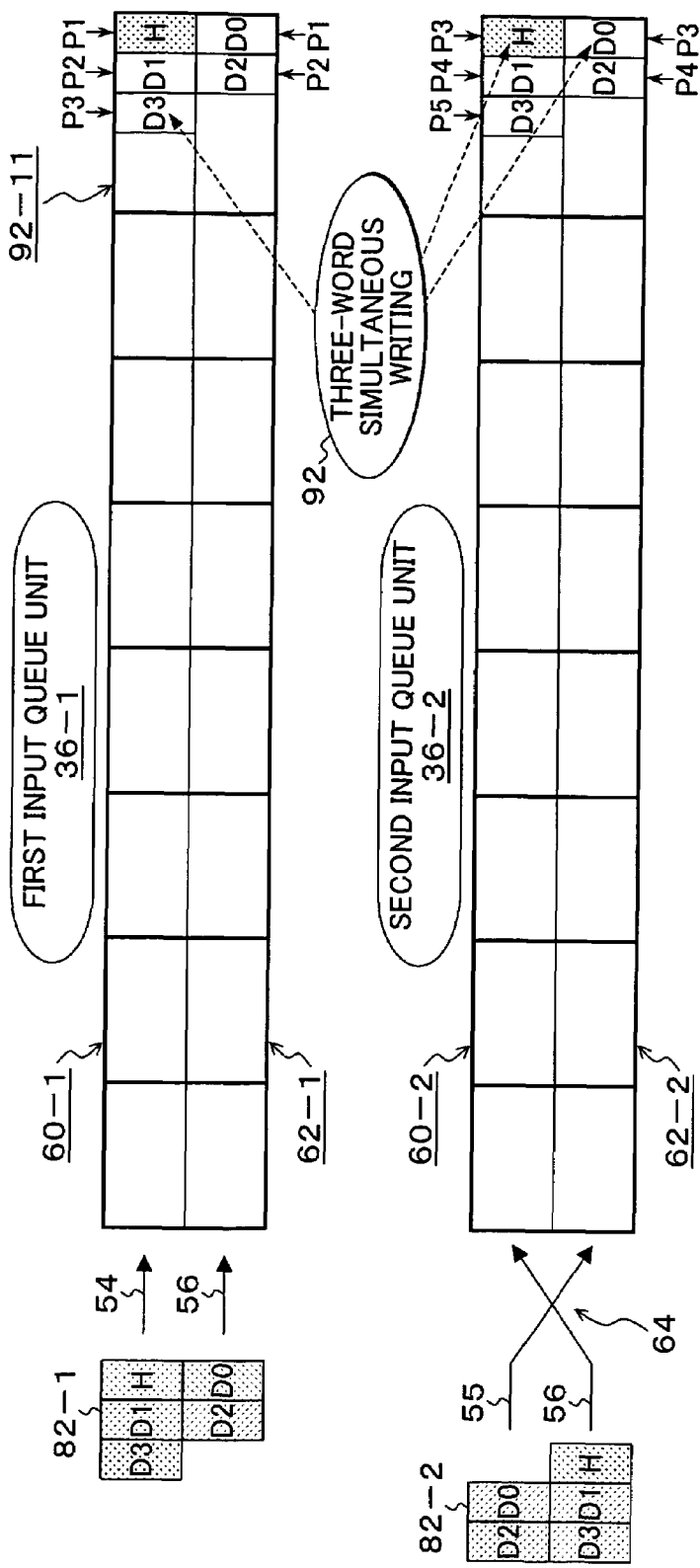

FIGS. 13A and 13B are explanatory views of the three (3)-word simultaneous writing for the packet boundary in the case where packets addressed to different destinations and at odd-numbered reception timing following a packet at even-numbered reception timing are sequential. FIG. 13A shows latch input timing and the header of the packet 82-1 at the head is at even-numbered reception timing of the external clock and the destination of this packet is the first input queue unit 36-1 of FIGS. 13A and 13B. The next packet 82-2 is at odd-numbered reception timing of the external clock and is addressed to the second input queue unit 36-2 that is a different destination of FIG. 13B. In this case, as to the packet 82-1 at the head, the header H, the word D0 of and the words D1 and D2 of the packet are written in parallel into the first even-numbered queue 60-1 and the first odd-numbered queue 62-1 as indicated by the write pointers P1 and P2 for the first input queue unit 36 according to the first case of FIG. 11A. Then, when the last word D3 of the packet 82-1 is latched by the data latch 48-1 of FIG. 8A, the header H of the next packet 82-2 is latched by the header latch 46-2 and the word D0 of the packet 82-2 is outputted through the bypass path 55. Then, on the packet boundary between the packet 82-1 and the next packet 82-2, the three (3)-word simultaneous writing is executed that consists of writing of the data D3 of the packet into the first even-numbered queue 60-1, writing of the header H of the next packet 82-2 into the second even-numbered queue 60-2, and writing of the word D0 of the next packet 82-2 into the second odd-numbered queue 62-2. More specifically, because the last word of the preceding packet 82-1 is latched by the data latch 48-1, the last word is written remaining latched into the first even-numbered queue 60-1 by designation of the write pointer P3 through the ordinary path 54. In addition, because the header H of the following packet 82-2 is latched by the header latch 46-2, the header H is written into the second even-numbered queue 60-2 as indicated by the write pointer P3 by the swap operation for selecting using a selector 68-2 of the swap circuit unit 64 from the ordinary path 56. Furthermore, as to the word D0 of the following packet 82-2 obtained through the bypass path 55 from the bypass unit 52, after being selected by a selector 66-2 of the swap circuit unit 64, the word D0 is written into the second odd-numbered queue 62-2 by the swap operation for selecting using a selector 70-2. When the three (3)-word simultaneous writing on the packet boundary as above has been finished, as to the remaining words D1 to D3 of the following packet 82-2, similarly, internal writing is executed in a state where the bypass and the swap are effective, and the last word D3 of the packet is written on the side of the second even-numbered queue 60-2 by the swap.

FIGS. 14A and 14B are explanatory views showing a process of the present invention for sequentially reading packets at even-numbered reception timing from the input queue unit, compared to a conventional process. FIG. 14A shows a convention read process and FIG. 14B shows the reading process of the present invention. In the conventional read process of FIG. 14A, writing of the headers H at even-numbered reception timing into the first even-numbered queue 60-1 and the first odd-numbered queue 620-1 is executed such that the headers H are positioned in the first even-numbered queue 60-1 for each of the packets. Therefore, when the packets are sequentially read by designation of the read pointers P1 to P6, packet data 100 having been read generates a void 102 of timing on the packet boundary portion. In contrast, in the reading process of the present invention of FIG. 14B, even when packets at even-numbered reception timing are sequentially received, because the headers H are written such that the headers H are arranged alternately between the first even-numbered queue 60-1 and the first odd-numbered queue 62-1, reading is executed necessarily by two (2) words at each time when the packets are read sequentially as indicated by the read pointers P1 to P5. Therefore, no void of timing is generated on the boundary portion between packets for read packet 104 and, thereby, the throughput of the packet transfer through the input queue unit can be improved.

Figure 15B:
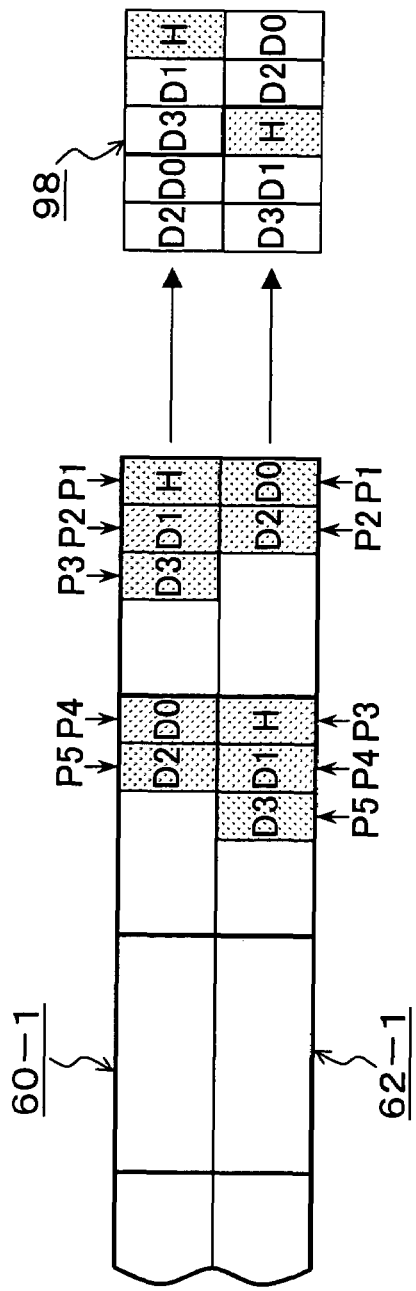

FIGS. 15A and 15B are explanatory views showing a process of the present invention for sequentially reading packets at odd-numbered reception timing from the input queue unit, compared to a conventional process. FIG. 15A is an explanatory view of the conventional process and the FIG. 15B is an explanatory view of the process of the present invention. In the explanatory view of the conventional process of FIG. 15A, when packets at odd-numbered reception timing are sequential, a header H of each packet is written such that the header H is positioned on the side of the first odd-numbered queue 62-1. Therefore, when packets are read, a read packet 94 read according to the designation of the read pointers P1 to P6 generates a void 96 of timing on the packet boundary portion. In contrast, in the present invention of FIG. 15B, when even the packets at odd-numbered reception timing are received sequentially, writing is executed such that, for the packet at the head, the header H is necessarily arranged in the first even-numbered queue 60-1 that is on the even-numbered side and, for the next packet, the header H is stored to be necessarily on the side of the first odd-numbered queue 62-1. Therefore, no void on the packet boundary portion is generated for the read packet 98 read word by word by the designation of the read pointers P1 to P5 and, therefore, the throughput can be improved.

FIGS. 16A to 16C show a flow chart of a packet writing process into the input queue unit of the present invention. In this writing process, whether or not a packet to be processed currently is inputted sequentially following the packet at the previous stage is checked in step S1 and, if the packets are sequential, the process is progressed to step S2 and, if the packets are not sequential, the process is progressed to step S3. In step S2, whether or not input is into a queue different from the queue for the packet at the previous stage, that is, whether or not the destination of the packet is different is checked and, if the destination is different, the process is progressed to step S3 and, if the destination is same, the process is progressed to step S11. When the destination is different, whether or not the header of the packet to be processed currently is inputted at even-numbered reception timing of the external block is checked in step S3 and, if the timing is even-numbered reception timing, the process is progressed to step S4 and, if the timing is odd-numbered reception timing, the process is progressed to step S7. In step S4, whether or not the stage to be written into of the input queue is an odd-numbered stage is checked and, if the stage is an odd-numbered stage, the process is progressed to step S5 at which the ordinary path is selected and writing is executed. The process to reach this step S5 including S5 is referred to as "Case 1 Process". In step S4, if the stage to be written into is an even-numbered stage, the process is progressed to step S6 at which the swap path is selected and the writing is executed. The process to reach this step S6 including S6 is referred to as "Case 2 process". On the other hand, if the packets are at odd-numbered reception timing in step S3, after selecting the bypass path in step S7, whether or not the stage to be written into is an odd-numbered stage is checked in step S8. If the stage is an odd-numbered stage, the process is progressed to step S9 at which the swap path is selected and the writing is executed. This is referred to as "Case 3". Furthermore, if the stage to be written into of the input queue is an even-numbered stage in step S8, the process is progressed to step S10 at which the ordinary path is selected and writing is executed. The process to reach this step S10 including S10 is referred to as "Case 4". If input into a queue for the same destination as that of the packet for the previous stage has been determined in step S2, the process is progressed to step S12 if the packet is at even-numbered reception timing in step S11 and, if the stage to be written into of the input queue is an odd-numbered stage, the ordinary path is selected and writing is executed in step S13. The process to reach this step S13 including S13 is referred to as "Case 5". Furthermore, if the stage to be written into of the input queue is an even-numbered stage in step S12, the process is progressed to step S14 at which the swap path is selected and writing is executed. The process to reach this step S14 including S14 is referred to as "Case 6". If the reception timing of the packet addressed to the same destination is odd-numbered reception timing of the external clock in step S11, the process is progressed to step S15 of FIG. 16C and, if the packet at the previous stage is at even-numbered reception timing, whether or not the stage to be written into of the input queue is an odd-numbered stage is checked in step S16. Then, if the stage is an odd-numbered stage, the process is progressed to step S17 at which the swap path is selected and writing is executed. The process to reach this step S17 including S17 is referred to as "Case 7". Furthermore, if the stage to be written into of the input queue is an even-numbered stage in step S16, the ordinary path is selected and writing is executed in step S18. The process to reach this step S18 including S18 is referred to as "Case 8". When the packet at the previous stage is in the queue for the same destination and the packet is at odd-numbered reception timing in step S15, if the packet at the previous stage is at odd-numbered reception timing, the process is progressed to step S19 at which the bypass path is selected and, thereafter, if the stage to be written into of the input queue is determined to be an odd-numbered stage in step S20, the process is progressed to step S21 at which the swap path is selected and writing is executed. The process to reach this step S21 including S21 is referred to as "Case 9". Furthermore, if the stage to be written into of. the input queue is an even-numbered stage in step S20, the process is progressed to step S22 at which the ordinary path is selected and writing is executed. The process to reach this step S22 including S22 is referred to as "Case 10".

FIGS. 17A and 17B are explanatory views of the writing processes of Case 1 and the Case 2 in the flowchart of FIGS. 16A and 16B. FIG. 17A shows the process of Case 1 for the case where:

(1) The packets are inputted sequentially or inputted individually (intermittent input);

(2) When the packets are inputted sequentially, the destination of a packet is different from that of the packet at the previous stage;

(3) The packet is at even-numbered reception timing; and (4) The stage to be written into of the input queue is an odd-numbered stage.

In Case 1 under these conditions (1) to (4), for the packet obtained at latch input timing, the ordinary paths 54 and 56 are selected and writing is executed at an odd-numbered stage #1 of the even-numbered queue 60 and the odd-numbered queue 62.

FIG. 17B shows Case 2 and the point of Case 2 that is different from the Case 1 of FIG. 17A is the point that the stage to be written into of the input queue is changed from the even-numbered stage to an odd-numbered stage as in the condition (4). In this case, the same operation as in Case 1 is applied for the packet at latch input timing 106. However, storage position which is the stage to be written into in the even-numbered queue 60 and the odd-numbered queue 62 is an even-numbered stage #2 and, for the even-numbered stage #2, the header H is necessarily arranged on the side of the odd-numbered queue 62. Then, the swap path 108 that exchanges the ordinary path 54 and the ordinary path 56 is selected for the data latched by the latch input timing 106 and the data is written into the even-numbered queue 60 and the odd-numbered queue 62.

FIGS. 17C and 17D are explanatory views of the writing processes of Case 3 and Case 4 in the flowchart of FIGS. 16A and 16B. FIG. 17C shows Case 3 for the case where the even-numbered reception timing is changed to the odd-numbered reception timing in the condition (3) of Case 1. That is, as shown in FIG. 17C, the header H of the received packet is at odd-numbered reception timing in the latch input timing 110 and, thereby, the header H is positioned in a path on the odd-numbered side. Then, because the stage to be stored in of the even-numbered queue 60 and the odd-numbered queue 62 is the odd-numbered stage #1, even the header H at odd-numbered reception timing must be arranged necessarily on the side of the even-numbered queue 60. Therefore, the header H on the odd-numbered side at the latch input timing 110 is sent to and stored on the side of the even-numbered queue 60 by a swap path 114. As to the word D0 of the packet following the header H, by selecting the bypass path 55 from the bypass unit 52 and selecting the swap path by the swap circuit unit 64, the word D0 is written into the odd-numbered queue 62 as the bypass and a swap path 112. In a similar state where the swap path 114, the bypass and the swap path 112 are maintained, a writing process for the remaining words D1 to D3 into the odd-numbered stage #1 of the even-numbered queue 60 and the odd-numbered queue 62 is executed. FIG. 17D shows Case 4 at step S10 of FIGS. 16A and 16B. Case 4 is the case where the stage to be written into for the even-numbered queue 60 and the odd-numbered queue 62 in Case 3 of FIG. 17C is changed from the odd-numbered stage #1 to the even-numbered stage #2. In this case, the ordinary paths 54 and 56 are selected and the writing is executed without any additional processing. Next, Case 5 and Case 6 of FIGS. 16A and 16B are the cases where the packets at the previous stage in Case 2 are changed from the packets addressed to different destinations to packets addressed to the same destination, i.e., input to the same queue. In these cases, Case 5 is similar to Case 1 of FIG. 17A and Case 6 is similar to Case 2 of FIG. 17B.

FIGS. 17E and 17F are explanatory views of Case 7 and Case 8 respectively for reaching steps S17 and S18 of FIG. 16C. Case 7 of FIG. 17E is the case where the header of the packet addressed to the same destination as that of the packet at the previous stage is at odd-numbered reception timing of the external clock and, in this case, the packet at the previous stage is at even-numbered reception timing and the stage to be written into of the input queue is at odd-numbered reception timing. That is, as shown in latch input timing 116, for the packet 82-1 at the previous stage of the packet 82-2 to be processes currently, the header H is at even-numbered reception timing, and the stage to be written into in the even-numbered queue 60 and the odd-numbered queue 62 of the packet 82-2 is an odd-numbered stage #3. In this case, as to the header H of the packet 82-2, the stage to be written into is the odd-numbered stage #3. Therefore, the header H must be arranged necessarily on the side of the even-numbered queue 60 and, therefore, the header H is written into the even-numbered queue 60 by the bypass and the swap path 118 formed by exchanging the ordinary paths 54 and 56. FIG. 17F shows Case 8 and Case 8 is the case where the stage to be written into of the input queue is an even-numbered stage in contrast with Case 7 of FIG. 17E. In this case, though the latch input timing 116 is same as that of Case 7 as to the packet 82-2, the stage to be stored in of the even-numbered queue 60 and the odd-numbered queue 62 is an even-numbered stage #4 and, therefore, the ordinary paths 54 and 56 are selected and writing is executed without any additional processing.

FIGS. 17G and 17H show the processes of Case 9 and Case 10 of FIG. 16C. FIG. 17G shows the process of Case 9 and Case 9 is the case where the packet at the previous stage is at odd-numbered reception timing in contrast with Case 7 of FIG. 17E. In Case 9 of FIG. 17G, as in latch input timing 120, the header H of the packet 82-2 to be packet-processed is at an odd-reception timing and the header H of the packet 82-1 at the previous stage is at odd-numbered reception timing. In addition, the stage to be stored in of the packet 82-2 is the odd-numbered stage #3 of the even-numbered queue 60 and the odd-numbered queue 62. Therefore, the header H of the packet 82-2 must be arranged on the side of the even-numbered queue 60. Thus, as to the header H, the swap path 121 is selected and, as to the next word D0 of the packet, swapping is executed concurrently with bypassing. Therefore, the bypass and the swap path 122 are selected and writing is executed. FIG. 17H shows Case 10 of FIG. 16C. In this case, the stage to be stored in of the even-numbered queue 60 and the odd-numbered queue 62 is an even-numbered stage #4. Therefore, the ordinary paths 54 and 56 are selected without any additional processing and writing is executed. As a result of the writing processes of Case 1 to Case 10 as described above, regardless of whether or not the packets are sequential and whether the destinations are same or different, the headers are consequently written one after another with the storage of packets alternate between the even-numbered queue 60 and the odd-numbered queue 62 with the even-numbered queue 60 as the starting point as shown in FIG. 10. Thereby, when the packets are read sequentially from the even-numbered queue 60 and the odd-numbered queue 62, as show in FIG. 14B and FIG. 15B, the packet can be read sequentially without generating any packet void in the packet boundary portion between the inputted packets and, therefore, the throughput can be improved. Furthermore, because the present invention uses a processor as the control unit 70 shown in FIGS. 8A and 8B, a control process can be realized by causing this processor to execute a program having the content same as that of the flowchart shown in FIG. 16C and FIGS. 17A and 17B and, therefore, the present invention provides a program itself that this control unit 70 executes. However, the present invention encompasses any appropriate variations without impairing the object and advantages thereof. Furthermore, the present invention is not limited to the numerical data indicated in the above embodiment.

What is claimed is:

1. A cross bar apparatus that is configured to set frequency of an internal clock thereof at ½ of frequency of an external clock used for transferring packets mutually between a plurality of modules and to configure an internal bus width thereof to be two (2) times as wide as an external bus width, and that reads received packets after storing and classifying the packets by destination, the cross bar apparatus comprising:

a packet receiving unit receiving packets transferred word by word synchronizing with the external clock as well as dividing a plurality of words of the packets including headers into those at even-numbered reception timing and those at odd-numbered reception timing of the external clock, and outputting the words and the headers in parallel synchronizing with the internal clock;

an even-numbered latch unit latching the words of the packets at even-numbered reception timing outputted from the packet receiving unit;

an odd-numbered latch unit latching the words of the packets at odd-numbered reception timing outputted from the packet receiving unit;

even-numbered queues respectively for each destination, each even-numbered queue including a plurality of stages of multi-stage packet storage sectors to be written into with, packet by packet, the words of the packet at even-numbered reception timing outputted from the even-numbered latch unit;

odd-numbered queues respectively for each destination, each odd-numbered queue including a plurality of stages of multi-stage packet storage sectors to be written into with, packet by packet, the words of the packet at odd-numbered reception timing outputted from the odd-numbered latch unit;

a bypass unit bypassing the even-latch unit;

a swap circuit unit swapping outputs of the even-numbered latch unit and the bypass unit to the odd-numbered queue unit as well as swapping an output of the odd-numbered latch unit to the even-numbered queue unit;

a write control unit, when a plurality of packets are received sequentially, writing words of the packets such that headers of the received packets are respectively arranged alternately in each of the packet storage sectors of the even-numbered queue and the odd-numbered queue between these queues; and a read control unit reading in parallel the words of the packets by two (2) words at each time from the even-numbered queue and the odd-numbered queue.

2. A cross bar apparatus according to claim 1, wherein a reception timing of a header of a packet received alone and a reception timing of a header of the packet at the head of packets received sequentially is set at the even-numbered reception timing of the external clock.

3. A cross bar apparatus according to claim 1, wherein, when a plurality of packets are received intermittently or sequentially, the write control unit writes words of the packets such that headers of odd-numbered received packets are arranged one after another in the odd-numbered-stage packet storage sectors of the even-numbered queue, and headers of even-numbered received packets are arranged one after another in an even-numbered-stage packet storage sectors of the odd-numbered queue.

4. A cross bar apparatus according to claim 1, wherein, when the cross bar apparatus comprises eight (8)-stage-configured packet storage sectors as the even-numbered queue and the odd-numbered queue, the write control unit write the words of the packets such that headers of first, third, fifth and seventh received packets are arranged one after another in first, third, fifth and seventh packet storage sectors of the even-numbered queue, and headers of second, fourth, sixth and eighth received packets are arranged one after another in second, fourth, sixth and eighth packet storage sectors of the odd-numbered queue.

5. A cross bar apparatus according to claim 4, wherein the read control unit:

reads the words of the packets in parallel by two (2) words at each time from the packet storage sectors at the odd-numbered stages of the even-numbered queue and the odd-numbered queue;

in a boundary portion with the packet storage sectors at the next even-numbered stage, reads in parallel two (2) words that are the last word in the packet storage sector at the preceding odd-numbered stage and the header in the packet storage sector at a following even-numbered stage;

as to the remaining words of the packet in the packet storage sectors at an even-numbered stage after reading the header, reads the words of the packet in parallel by two (2) words at each time from a position shifted by one (1) word from the packet storage sector at an even-numbered stage in the even-numbered queue and the odd-numbered queue; and thereafter, repeats the above operations.

6. A cross bar apparatus according to claim 1, wherein, when packets addressed to different destinations are received intermittently or sequentially, the write control unit:
- in the case where the headers of the received packets are at even-numbered reception timing and the packet storage sector is an odd-numbered stage of the even-numbered queue and the odd-numbered queue, writes the words of the packets including the headers at the even-numbered reception timing latched by the even-numbered latch unit into the odd-numbered-stage packet storage sectors in the even-numbered queue as well as writes the words of the packets at the odd-numbered reception timing latched by the odd-numbered latch unit into an odd-numbered-stage packet storage sectors in the odd-numbered queue; and
- in the case where the headers of the received packets are at even-numbered reception timing and the packet storage sector is an even-numbered stage of the even-numbered queue and the odd-numbered queue, swaps and writes the words of the packets including the headers at the even-numbered reception timing latched by the even-numbered latch unit into an even-numbered-stage packet storage sectors in the odd-numbered queue as well as swaps and writes the words of the packets at the odd-numbered reception timing latched by the odd-numbered latch unit into the even-numbered-stage packet storage sectors in the even-numbered queue.

7. A cross bar apparatus according to claim 1, wherein, when packets addressed to different destinations are received intermittently or sequentially, the write control unit:
- in the case where the headers of the received packets are at odd-numbered reception timing and the packet storage sectors of the even-numbered queue and the odd-numbered queue are in odd-numbered stage, swaps and writes the words of the packets including headers at odd-numbered reception timing latched by the odd-numbered latch unit into the packet storage sectors at odd-numbered stages in the even-numbered queue as well as writes the words of the packets at even-numbered reception timing obtained by swapping after bypassing by the bypass unit into odd-numbered-stage packet storage sectors in the odd-numbered queue; and
- in the case where the headers of the received packets are at odd-numbered reception timing and the packet storage sectors of the even-numbered queue and the odd-numbered queue are in even-numbered stage, writes the words of the packets including headers at odd-numbered reception timing latched by the odd-numbered latch unit into the packet storage sectors at odd-numbered stages in the odd-numbered queue as well as writes the words of the packets at even-numbered reception timing bypassed by the bypass unit into even-numbered-stage packet storage sectors in the even-numbered queue.

8. A cross bar apparatus according to claim 1, wherein, when a first destination packet having the header at even-numbered reception timing and, following the first destination packet, a second destination packet having the header at odd-numbered reception timing and addressed to a different destination from that of the first destination packet are received sequentially, as to the boundary portion between the first destination packet and the second destination packet, the write control unit:
- writes the last word of the first destination packet latched by the even-numbered latch unit into an even-numbered queue corresponding to the first destination;
- swaps and writes the header of the second destination packet latched by the odd-numbered latch unit into an even-numbered queue corresponding to the second destination; and
- swaps and writes the word of the packet next to the header of the second destination packet obtained from a first bypass unit into an odd-numbered queue corresponding to the second destination, to thus execute three (3)-words-of-the-packet simultaneous writing.

9. A cross bar apparatus according to claim 1, wherein, when packets addressed to the same destination are received sequentially, the write control unit:
- in the case where the headers of the received packets are at even-numbered reception timing and the packet storage sectors of the even-numbered queue and the odd-numbered queue are in odd-numbered stage, writes the words of the packets including headers at even-numbered reception timing latched by the even-numbered latch unit into the packet storage sectors at odd-numbered stages in the even-numbered queue as well as writes the words of the packets at odd-numbered reception timing latched by the odd-numbered latch unit into odd-numbered packet sectors in the odd-numbered queue; and
- in the case where the headers of the received packets are at even-numbered reception timing and the packet storage sectors of the even-numbered queue and the odd-numbered queue are in even-numbered stage, swaps and writes the words of the packets including headers at even-numbered reception timing latched by the even-numbered latch unit into the packet storage sectors at even-numbered stages in the odd-numbered queue as well as swaps and writes the words of the packets at odd-numbered reception timing latched by the odd-numbered latch unit into packet storage sectors in the even-numbered stages in the even-numbered queue.

10. A cross bar apparatus according to claim 1, wherein, when packets addressed to the same destination are received sequentially, the write control unit:
- in the case where the headers of the received packets are at odd-numbered reception timing, the header of the packet in the previous stage is at even-numbered reception timing and the packet storage sectors of the even-numbered queue and the odd-numbered queue are in odd-numbered stage, swaps and writes the words of the packets including headers at odd-numbered reception timing latched by the odd-numbered latch unit into the packet storage sectors in odd-numbered stages in the even-numbered queue as well as swaps and writes the words of the packets at even-numbered reception timing latched by the even-numbered latch unit into odd-numbered packet sectors in the odd-numbered queue; and
- in the case where the headers of the received packets are at odd-numbered reception timing, the header of the packet in the previous stage is at even-numbered reception timing and the packet storage sectors of the even-numbered queue and the odd-numbered queue are in even-numbered stage, writes the words of the packets including headers at odd-numbered reception timing latched by the odd-numbered latch unit into the packet storage sectors at even-numbered stages in the odd-numbered queue as well as writes the words of the packets at even-numbered reception timing latched by the even-numbered latch unit into packet storage sectors in the even-numbered stages in the even-numbered queue.

11. A cross bar apparatus according to claim 1, wherein, when packets addressed to the same destination are received sequentially, the write control unit:
- in the case where the headers of the received packets are at odd-numbered reception timing, the header of the packet in the previous stage is at odd-numbered reception timing and the packet storage sectors of the even-numbered queue and the odd-numbered queue are in odd-numbered stage, swaps and writes the words of the packets including headers at odd-numbered reception timing latched by the odd-numbered latch unit into the packet storage sectors in odd-numbered stages in the odd-numbered queue as well as bypasses using the bypass unit, and swaps and writes the words of the packets at even-numbered reception timing latched by the even-numbered latch unit into odd-numbered packet sectors in the odd-numbered queue; and in the case where the headers of the received packets are at odd-numbered reception timing, the header of the packet in the previous stage is at even-numbered reception timing and the packet storage sectors of the even-numbered queue and the odd-numbered queue are in even-numbered stage, writes the words of the packets including headers at odd-numbered reception timing latched by the odd-numbered latch unit into the packet storage sectors at odd-numbered stages in the odd-numbered queue as well as writes the words of the packets at even-numbered reception timing latched by the even-numbered latch unit into packet storage sectors in the even-numbered stages in the even-numbered queue.

12. A cross bar apparatus according to claim 1, wherein the write control unit writes the two (2) words of the words of the packets in parallel into the even-numbered queue and the odd-numbered queue at any of:

at timing at which two (2) words of the words of the packet including the header are latched by the even-numbered latch unit and the odd-numbered latch unit;

at timing at which two (2) words of the words of the packet including the header are latched and swapped by the even-numbered latch unit and the odd-numbered latch unit; and at timing at which the words of the packets including the header are latched by the odd-numbered latch unit and the words of the packets bypassed are outputted from the bypass unit.

13. A method of controlling a cross bar apparatus that is configured to set frequency of an internal clock thereof at/1;2 of frequency of an external clock used for transferring packets mutually between a plurality of modules and to configure an internal bus width thereof to be two (2) times as wide as an external bus width, and that reads received packets after storing and classifying the packets by destination, the method comprising:

a packet receiving step of receiving packets transferred word by word synchronizing with the external clock as well as dividing a plurality of words of the packets including headers into those at even-numbered reception timing and those at odd-numbered reception timing of the external clock, and outputting the words and the headers in parallel synchronizing with the internal clock;

an even-numbered latch step of latching into an even-numbered latch unit the words of the packets at even-numbered reception timing outputted from the packet receiving step;

an odd-numbered latch step of latching into an odd-numbered latch unit the words of the packets at odd-numbered reception timing outputted from the packet receiving step;

even-numbered queue step of writing, packet by packet, the words of the packet at even-numbered reception timing outputted from the even-numbered latch unit, into each even-numbered queue for each destination including a plurality of stages of multi-stage packet storage sectors;

odd-numbered queue step of writing, packet by packet, the words of the packet at odd-numbered reception timing outputted from the odd-numbered latch unit, into each odd-numbered queue for each destination including a plurality of stages of multi-stage packet storage sectors;

a bypass step of bypassing the even-latch unit;

a swap step of swapping outputs of the even-numbered latch unit and the bypass unit to the odd-numbered queue unit as well as swapping an output of the odd-numbered latch unit to the even-numbered queue unit;

a write control step, when a plurality of packets are received sequentially, of writing words of the packets such that headers of the received packets are respectively arranged alternately in each of the packet storage sectors of the even-numbered queue and the odd-numbered queue between these queues; and a read control step of reading in parallel the words of the packets by two (2) words at each time from the even-numbered queue and the odd-numbered queue.

14. A method of controlling a cross bar apparatus according to claim 13, wherein a reception timing of a header of a packet received intermittently and a reception timing of a header of the packet at a head of packets received sequentially is set at the even-numbered reception timing of the external clock.

15. A method of controlling a cross bar apparatus according to claim 13, wherein, the write control step includes, when a plurality of packets are received intermittently or sequentially, writing words of the packets such that headers of odd-numbered received packets are arranged one after another in the odd-numbered-stage packet storage sectors of the even-numbered queue, and such that headers of even-numbered received packets are arranged one after another in the even-numbered-stage packet storage sectors of the odd-numbered queue.

16. A method of controlling a cross bar apparatus according to claim 13, wherein the write control step includes, when the cross bar apparatus comprises eight (8)-stage-configured packet storage sectors as the even-numbered queue and the odd-numbered queue, writing the words of the packets such that headers of first, third, fifth and seventh received packets are arranged one after another in first, third, fifth and seventh packet storage sectors of the even-numbered queue, and such that headers of second, fourth, sixth and eighth received packets are arranged one after another in second, fourth, sixth and eighth packet storage sectors of the odd-numbered queue.

17. A method of controlling a cross bar apparatus according to claim 13, wherein the write control step includes, when a first destination packet having the header at even-numbered reception timing and, following the first destination packet, a second destination packet having the header at odd-numbered reception timing and addressed to a different destination from that of the first destination packet are received sequentially, as to the boundary portion between the first destination packet and the second destination packet, writing the last word of the first destination packet latched in the even-numbered latch step into an even-numbered queue corresponding to the first destination;

swapping and writing the header of the second destination packet latched in the odd-numbered latch step into an even-numbered queue corresponding to the second destination; and swapping and writing the word of the packet next to the header of the second destination packet obtained from the bypass step into an odd-numbered queue corresponding to the second destination, to thus execute three (3)-words-of-the-packet simultaneous writing.

18. A method of controlling a cross bar apparatus according to claim 13, wherein the write control unit step includes writing the two (2) words of the words of the packets in parallel into the even-numbered queue and the odd-numbered queue at any of:

at timing at which two (2) words of the words of the packet including the header are latched in the even-numbered latch step and the odd-numbered latch step;

at timing at which two (2) words of the words of the packet including the header are latched and swapped in the even-numbered latch step and the odd-numbered latch step; and at timing at which the words of the packets including the header are latched in the odd-numbered latch step and the words of the packets bypassed are outputted from the bypass step.

19. A method of controlling a cross bar apparatus according to claim 13, wherein the read control step includes:

reading the words of the packets in parallel by two (2) words at each time from the packet storage sectors at the odd-numbered stages of the even-numbered queue and the odd-numbered queue;

in a boundary portion with the packet storage sectors at the next even-numbered stage, reading in parallel two (2) words that are the last word in the packet storage sector at the preceding odd-numbered stage and the header in the packet storage sector at a following even-numbered stage;

as to the remaining words of the packet in the packet storage sectors at an even-numbered stage after reading the header, reading the words of the packet in parallel by two (2) words at each time from a position shifted by one (1) word from the packet storage sector at an even-numbered stage in the even-numbered queue and the odd-numbered queue; and thereafter, repeating the above operations.

20. A computer-readable storage medium storing a program for controlling a cross bar apparatus that is configured to set frequency of an internal clock thereof at ½ of frequency of an external clock used for transferring packets mutually between a plurality of modules and to configure an internal bus width thereof to be two (2) times as wide as an external bus width, and that reads received packets after storing and classifying the packets by destination, wherein said program causes a computer to execute operations comprising:

a packet receiving step of receiving packets transferred word by word synchronizing with the external clock as well as dividing a plurality of words of the packets including headers into those at even-numbered reception timing and those at odd-numbered reception timing of the external clock, and outputting the words and the headers in parallel synchronizing with the internal clock;

an even-numbered latch step of latching into an even-numbered latch unit the words of the packets at even-numbered reception timing outputted from the packet receiving step;

an odd-numbered latch step of latching into an odd-numbered latch unit the words of the packets at odd-numbered reception timing outputted from the packet receiving step;

even-numbered queue step of writing, packet by packet, the words of the packet at even-numbered reception timing outputted from the even-numbered latch unit, into each even-numbered queue for each destination including a plurality of stages of multi-stage packet storage sectors;

odd-numbered queue step of writing, packet by packet, the words of the packet at odd-numbered reception timing outputted from the odd-numbered latch unit, into each odd-numbered queue for each destination including a plurality of stages of multi-stage packet storage sectors;

a bypass step of bypassing the even-latch unit;

a swap step of swapping outputs of the even-numbered latch unit and the bypass unit to the odd-numbered queue unit as well as swapping an output of the odd-numbered latch unit to the even-numbered queue unit;

a write control step, when a plurality of packets are received sequentially, of writing words of the packets such that headers of the received packets are respectively arranged alternately in each of the packet storage sectors of the even-numbered queue and the odd-numbered queue between these queues; and a read control step of reading in parallel the words of the packets by two (2) words at each time from the even-numbered queue and the odd-numbered queue.

21. A computer-readable storage medium according to claim 20, wherein a reception timing of a header of a packet received intermittently and a reception timing of a header of the packet at the head of packets received sequentially is set at the even-numbered reception timing of the external clock.

22. A cross bar apparatus that, in order to transfer packets mutually between a plurality of modules, reads received packets after storing and classifying the packets by destination, the cross bar apparatus comprising:

a packet receiving unit receiving packets transferred word by word, the packet receiving unit dividing a plurality of words of the packets including headers of the packets into those at even-numbered reception timing and those at odd-numbered reception timing to output the words and the headers in parallel;

an even-numbered latch unit latching the words of the packets at even-numbered reception timing outputted from the packet receiving unit;

an odd-numbered latch unit latching the words of the packets at odd-numbered reception timing outputted from the packet receiving unit;

even-numbered queues respectively for each destination, each even-numbered queue including a plurality of stages of multi-stage packet storage sectors to be written into with, packet by packet, the words of the packet at even-numbered reception timing outputted from the even-numbered latch unit;

odd-numbered queues respectively for each destination, each odd-numbered queue including a plurality of stages of multi-stage packet storage sectors to be written into with, packet by packet, the words of the packet at odd-numbered reception timing outputted from the odd-numbered latch unit;

a bypass unit bypassing the even-latch unit;

a swap circuit unit swapping outputs of the even-numbered latch unit and the bypass unit to the odd-numbered queue unit as well as swapping an output of the odd-numbered latch unit to the even-numbered queue unit;

a write control unit, when a plurality of packets are received sequentially, writing words of the packets such that headers of the received packets are respectively arranged alternately in each of the packet storage sectors of the even-numbered queue and the odd-numbered queue between these queues; and a read control unit reading in parallel the words of the packets by two (2) words at each time from the even-numbered queue and the odd-numbered queue.

* * * * *

UNITED STATES PATENT AND TRADEMARK OFFICE
CERTIFICATE OF CORRECTION

PATENT NO. : 7,583,706 B2  Page 1 of 1
APPLICATION NO. : 11/181826
DATED : September 1, 2009
INVENTOR(S) : Hideto Arai et al.

It is certified that error appears in the above-identified patent and that said Letters Patent is hereby corrected as shown below:

Column 25, Line 40, change "at/1;2" to --at 1/2--.

Signed and Sealed this

Seventeenth Day of November, 2009

David J. Kappos
*Director of the United States Patent and Trademark Office*